US012804693B2

(12) United States Patent
Yu

(10) Patent No.: US 12,804,693 B2
(45) Date of Patent: Nov. 17, 2026

(54) LONG INTER-FRAME SPACE AND ENHANCED REVERSE DIRECTION PROTOCOL FOR LOW LATENCY TRANSMISSION

(71) Applicant: Avalon Technology Solutions LLC, Frisco, TX (US)

(72) Inventor: Heejung Yu, Daejeon (KR)

(73) Assignee: Avalon Technology Solutions LLC, Frisco, TX (US)

( * ) Notice: Subject to any disclaimer, the term of this patent is extended or adjusted under 35 U.S.C. 154(b) by 628 days.

(21) Appl. No.: 18/179,333

(22) Filed: Mar. 6, 2023

(65) Prior Publication Data

US 2023/0284250 A1 Sep. 7, 2023

Related U.S. Application Data

(60) Provisional application No. 63/269,390, filed on Mar. 15, 2022, provisional application No. 63/268,970, filed on Mar. 7, 2022.

(51) Int. Cl.

| | |
|---|---|
| ***H04W 72/54*** | (2023.01) |
| ***H04L 5/00*** | (2006.01) |
| ***H04W 72/0446*** | (2023.01) |

(52) U.S. Cl.

CPC ........... *H04W 72/54* (2023.01); *H04L 5/0037* (2013.01); *H04L 5/0055* (2013.01); *H04W 72/0446* (2013.01)

(58) Field of Classification Search

CPC . H04W 72/54; H04W 72/0446; H04W 74/06; H04W 74/002; H04L 5/0037; H04L 5/0055; H04L 5/0007; H04L 5/0094

USPC .......................................................... 370/329

See application file for complete search history.

(56) References Cited

U.S. PATENT DOCUMENTS

| | | | | |
|---|---|---|---|---|
| 8,923,193 B2 * | 12/2014 | Hwang | ................. | H04W 16/14 370/235 |
| 2014/0185547 A1 * | 7/2014 | Matsuo | ................. | H04L 1/1848 370/329 |

* cited by examiner

*Primary Examiner* — Mang Hang Yeung

(74) *Attorney, Agent, or Firm* — Nutter McClennen & Fish LLP

(57) ABSTRACT

Disclosed herein is a method performed by wireless device in a wireless network to allow low latency transmissions between frames. The method includes generating a request frame that includes a long interframe space indication indicating that frames are to be wirelessly transmitted using a long interframe space interval, wherein the long interframe space interval is longer than at least one other interframe space interval used in the wireless network, wherein low latency transmissions are allowed during long interframe space intervals. The method further includes transmitting the request frame and wirelessly transmitting one or more frames using the long interframe space interval after wirelessly transmitting the request frame.

10 Claims, 30 Drawing Sheets

600

| | MAXIMUM PHY RATE | PHY RATE ENHANCEMENT | BANDWIDTH/NUMBER OF SPATIAL STREAMS | OPERATING BANDS |
|---|---|---|---|---|
| IEEE 802.11B | 11 MBPS | - | 22 MHZ/1 SS | 2.4 GHZ |
| IEEE 802.11A/G | 54 MBPS | 5X | 2 MHZ/1 SS | 5 GHZ(A)/2.4 GHZ(G) |
| IEEE 802.11N | 600 MBPS | 11X | 40 MHZ/4 SS | 2.4/5 GHZ |
| IEEE 802.11AC | 6.9 GBPS | 11X | 160 MHZ/8 SS | 5 GHZ |
| IEEE 802.11AX | 9.6 GBPS | 1.4X | 160 MHZ/8 SS | 2.4/5 GHZ |
| IEEE 802.11BE | A GBPS | BX | 320 MHZ/16 SS | 2.4/5/6 GHZ |

FIG. 6

700

| ELEMENT/FIELD | DEFINITION 702 | DURATION 704 | DFT PERIOD 706 | GUARD INTERVAL (GI) 708 | SUBCARRIER SPACING 710 |
|---|---|---|---|---|---|
| LEGACY-SHORT TRAINING FIELD (L-STF) 712 | NON-HIGH THROUGHPUT(HT) SHORT TRAINING FIELD (STF) | 8 μs | - | - | equivalent to 1,250 kHz |
| LEGACY-LONG TRAINING FIELD (L-LTF) 714 | NON-HT LONG TRAINING FIELD (LTF) | 8 μs | 3.2 μs | 1.6 μs | 312.5 kHz |
| LEGACY-SIGNAL FIELD (L-SIG) 716 | NON-HT SIGNAL FIELD | 4 μs | 3.2 μs | 0.8 μs | 312.5 kHz |
| RL-SIG FIELD 718 | REPEATED NON-HT SIGNAL FIELD | 4 μs | 3.2 μs | 0.8 μs | 312.5 kHz |
| U-SIG FIELD 720 | UNIVERSAL SIGNAL FIELD | $N_{USIG}$ * 4 μs | 3.2 μs | 0.8 μs | 312.5 kHz |
| EHT-SIG FIELD 722 | EHT SIGNAL FIELD | $N_{EHESIG}$ * 4 μs | 3.2 μs | 0.8 μs | 312.5 kHz |
| EHT-HARQ FIELD 724 | EHT HARQ FIELD | - | - | - | - |
| EHT-STF 726 | EHT SHORT TRAINING FIELD | - | - | - | - |
| EHT-LTF 728 | EHT LONG TRAINING FIELD | $N_{EHTLTF}$ * (DTF period + GI) μs | 2xLTF: 6.4 μs 4xLTF: 12.8 μs | 0.8, 1.6, or 3.2 μs | 2xLTF: (equivalent to) 156.25 kHz; 4xLTF: 78.125 kHz |
| EHT-DATA FIELD 730 | EHT DATA FIELD | $N_{DATA}$ * (DTF period + GI) μs | 12.8 μs | 0.8, 1.6, or 3.2 μs | 78.125 kHz |
| EHT-MA FIELD 732 | EHT MIDAMBLE FIELD | - | - | - | - |

FIG. 7

Common Info Field Format in a Trigger frame

User Info List Field Format in a Trigger frame

TABLE OF TRIGGER TYPE FIELD ENCODING 2300

| TRIGGER TYPE FIELD VALUE | TRIGGER FRAME VARIANT |
|---|---|
| 0 | BASIC |
| 1 | BEAMFORMING REPORT POLL (BFRP) |
| 2 | MU-BAR |
| 3 | MU-RTS |
| 4 | BUFFER STATUS REPORT POLL (BSRP) |
| 5 | GCR MU-BAR |
| 6 | BANDWIDTH QUERY REPORT POLL (BQRP) |
| 7 | NDP FEEDBACK REPORT POLL (NFRP) |
| 8-15 | RESERVED |

FIG. 23

TABLE OF TRIGGER TYPE FIELD ENCODING IN NEW TRIGGER FRAME 2400

| TRIGGER TYPE FIELD VALUE | TRIGGER FRAME VARIANT |
|---|---|
| 0 | BASIC |
| 1 | BEAMFORMING REPORT POLL (BFRP) |
| 2 | MU-BAR |
| 3 | MU-RTS |
| 4 | BUFFER STATUS REPORT POLL (BSRP) |
| 5 | GCR MU-BAR |
| 6 | BANDWIDTH QUERY REPORT POLL (BQRP) |
| 7 | NDP FEEDBACK REPORT POLL (NFRP) |
| **8** | **LOW LATENCY TRANSMISSION** |
| **9-12** | **BANDWIDTH (E.G., NORMAL, x2, x4, AND x8)** |
| 13-15 | RESERVED |

FIG. 24

TABLE OF TRIGGER TYPE FIELD ENCODING IN NEW TRIGGER FRAME 3200

| TRIGGER TYPE FIELD VALUE | TRIGGER FRAME VARIANT |
|---|---|
| 0 | BASIC |
| 1 | BEAMFORMING REPORT POLL (BFRP) |
| 2 | MU-BAR |
| 3 | MU-RTS |
| 4 | BUFFER STATUS REPORT POLL (BSRP) |
| 5 | GCR MU-BAR |
| 6 | BANDWIDTH QUERY REPORT POLL (BQRP) |
| 7 | NDP FEEDBACK REPORT POLL (NFRP) |
| **8-9** | **LOW LATENCY TRANSMISSION (E.G., NO GRANT AND GRANT)** |
| **10-11** | **LLT MORE (E.G., NO MORE AND MORE)** |
| 12-15 | RESERVED |

FIG. 32

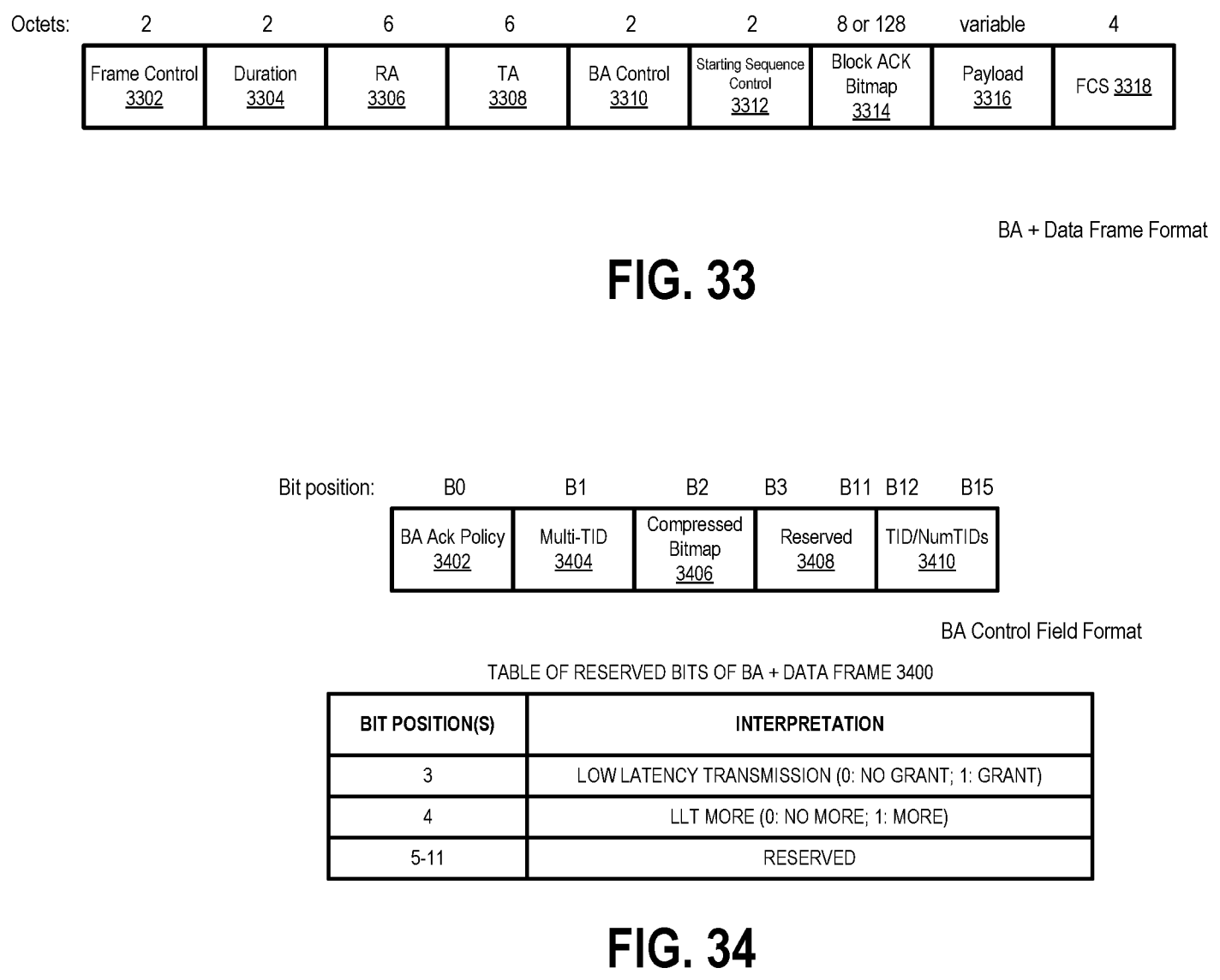

| Octets: | 2 | 2 | 6 | 6 | 2 | 2 | 8 or 128 | variable | 4 |
|---|---|---|---|---|---|---|---|---|---|
| | Frame Control 3302 | Duration 3304 | RA 3306 | TA 3308 | BA Control 3310 | Starting Sequence Control 3312 | Block ACK Bitmap 3314 | Payload 3316 | FCS 3318 |

BA + Data Frame Format

FIG. 33

| Bit position: | B0 | B1 | B2 | B3 B11 | B12 B15 |
|---|---|---|---|---|---|
| | BA Ack Policy 3402 | Multi-TID 3404 | Compressed Bitmap 3406 | Reserved 3408 | TID/NumTIDs 3410 |

BA Control Field Format

TABLE OF RESERVED BITS OF BA + DATA FRAME 3400

| BIT POSITION(S) | INTERPRETATION |
|---|---|
| 3 | LOW LATENCY TRANSMISSION (0: NO GRANT; 1: GRANT) |
| 4 | LLT MORE (0: NO MORE; 1: MORE) |
| 5-11 | RESERVED |

FIG. 34

BA + Data Frame Format with LLT Indication

Data Frame Format

TABLE OF RESERVED BITS OF HT CONTROL FIELD 3700

| BIT POSITION(S) | INTERPRETATION |
| --- | --- |
| 20 | LOW LATENCY TRANSMISSION (0: NO GRANT; 1: GRANT) |
| 21 | LLT MORE (0: NO MORE; 1: MORE) |
| 25-29 | RESERVED |

FIG. 37

TABLE OF RDG/MORE PPDU FIELD INTERPRETATION 3800

| VALUE | ROLE OF TRANSMITTING STA | INTERPRETATION OF VALUE |
| --- | --- | --- |
| 0 | RD INITIATOR | NO REVERSE GRANT |
| | RD RESPONDER | THE PPDU CARRYING THE FRAME IS THE LAST PPDU FROM THE RD RESPONDER |
| 1 | RD INITIATOR | A REVERSE DIRECTION GRANT IS PRESET FOR THE DURATION GIVEN IN THE DURATION/ID FIELD |
| | RD RESPONDER | THE PPDU CARRYING THE FRAME IS FOLLOWED BY ANOTHER PPDU |

FIG. 38

LONG INTER-FRAME SPACE AND ENHANCED REVERSE DIRECTION PROTOCOL FOR LOW LATENCY TRANSMISSION

CROSS-REFERENCE TO RELATED APPLICATION

This application claims the benefit of U.S. Provisional Application No. 63/268,970, filed Mar. 7, 2022, titled, "LONG INTER-FRAME SPACE FOR LOW LATENCY TRANSMISSION"; and U.S. Provisional Application No. 63/269,390, filed Mar. 15, 2022, titled, "ENHANCED REVERSE DIRECTION PROTOCOL FOR LOW LATENCY TRANSMISSION", which are hereby incorporated by reference.

TECHNICAL FIELD

The present disclosure generally relates to wireless communications, and more specifically, relates to providing low latency transmission in a wireless network.

BACKGROUND

Institute of Electrical and Electronics Engineers (IEEE) 802.11 is a set of physical and Media Access Control (MAC) specifications for implementing Wireless Local Area Network (WLAN) communications. These specifications provide the basis for wireless network products using the Wi-Fi brand managed and defined by the Wi-Fi Alliance. The specifications define the use of the 2.400-2.500 Gigahertz (GHz) as well as the 4.915-5.825 GHz bands. These spectrum bands are commonly referred to as the 2.4 GHz and 5 GHz bands. Each spectrum is subdivided into channels with a center frequency and bandwidth. The 2.4 GHz band is divided into 14 channels spaced 5 Megahertz (MHz) apart, though some countries regulate the availability of these channels. The 5 GHz band is more heavily regulated than the 2.4 GHz band and the spacing of channels varies across the spectrum with a minimum of a 5 MHz spacing dependent on the regulations of the respective country or territory.

WLAN devices are currently being deployed in diverse environments. These environments are characterized by the existence of many Access Points (APs) and non-AP stations (STAs) in geographically limited areas. Increased interference from neighboring devices gives rise to performance degradation. Additionally, WLAN devices are increasingly required to support a variety of applications such as video, cloud access, and offloading. Video traffic, in particular, is expected to be the dominant type of traffic in WLAN deployments. With the real-time requirements of some of these applications, WLAN users demand improved performance.

Conventional WLANs allow stations to occupy channels or links for a long period of time (e.g., by granting a transmission opportunity (TXOP) to a station) to avoid having to compete for channel access with other stations. Also, conventional WLANs allow stations to transmit data using aggregation to improve throughput. However, these features of conventional WLANs make it difficult for low latency applications or stations to obtain channel access opportunities, which makes it difficult to satisfy strict latency requirements.

One conventional technique to allow low latency transmission is to use overlaid transmission. However, with overlaid transmission, the impact of interference may cause performance degradation. The method of stopping transmission of other devices and giving opportunities to low latency transmission devices is complicated, and conflicts with distributed contention based medium access mechanisms, which is used by the IEEE 802.11 MAC layer.

Another conventional technique to allow low latency transmission is to use a reverse direction protocol. However, with reverse direction protocol, transmission opportunities for low latency transmission devices are limited and inefficient. This is because short and intermittent transmission (which are common characteristics of low latency transmission) conflict with the primary purpose of the TXOP mechanism. As a result, the efficiency of low latency transmission using the reverse direction protocol is reduced due to unnecessary overhead.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 6 shows a table comparing various iterations of Institute of Electrical and Electronics Engineers (IEEE) 802.11 standard, in accordance with some embodiments of the present disclosure.

FIG. 7 shows a table, which describes fields of an Extreme High Throughput (EHT) frame format, in accordance with some embodiments of the present disclosure.

FIG. 23 is a diagram showing a table of trigger type field encoding in a trigger frame in IEEE 802.11ax.

FIG. 24 is a diagram showing a table of trigger type field encoding in a trigger frame, according to some embodiments.

FIG. 32 is a diagram showing a table of trigger type field encoding in a trigger frame, according to some embodiments.

FIG. 33 is a combined block ACK and data frame format, according to some embodiments.

FIG. 34 is a diagram showing a BA control field format and interpretation of the reserved field, according to some embodiments.

FIG. 37 is a diagram showing a table of an interpretation of reserved bits of a HT control field, according to some embodiments.

FIG. 38 is a diagram showing a table of an interpretation of a RDG/more PPDU field, according to some embodiments.

DETAILED DESCRIPTION

Figure 1:
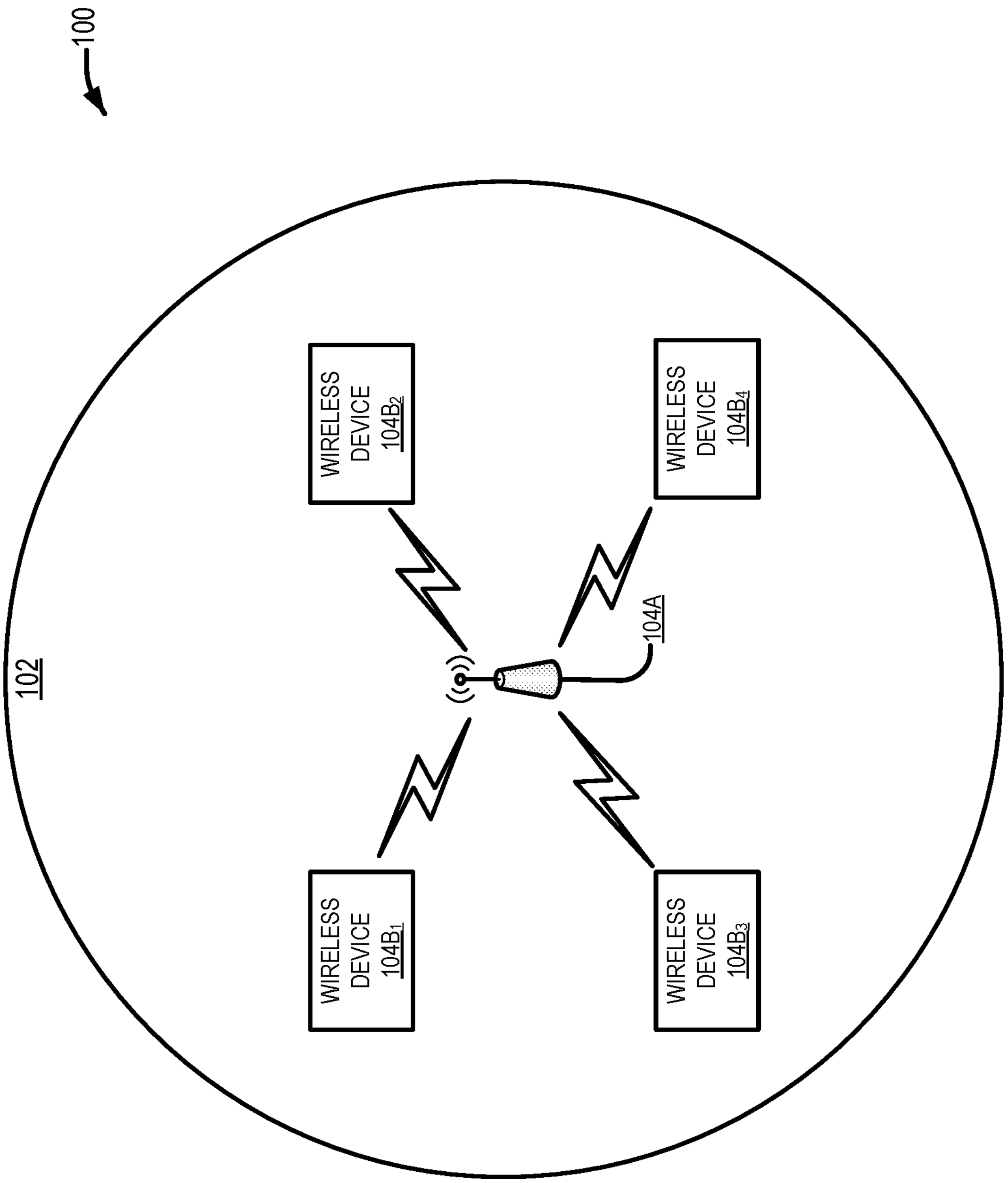
FIG. 1 illustrates an example wireless local area network (WLAN) with a basic service set (BSS) that includes a plurality of wireless devices, in accordance with some embodiments of the present disclosure.

One aspect of the present disclosure generally relates to wireless communications, and more specifically, relates to using a long interframe space (LIFS) interval to allow low latency transmission in a wireless network.

According to some embodiments, when a station occupies a channel for a long period of time, the station transmits data frames using a LIFS interval without using aggregation. During the LIFS interval, low latency transmission stations are allowed to transmit data frames and/or acknowledgement frames to satisfy the low latency requirement. In some embodiments, in order to improve transmission efficiency, the interframe space being used can be dynamically changed. Also, in some embodiments, the transmission bandwidth being used can be dynamically changed.

An embodiment is a method performed by a wireless device in a wireless network to allow low latency transmissions between frames. The method includes generating a request frame that includes a long interframe space indication indicating that frames are to be wirelessly transmitted using a long interframe space interval. The long interframe space interval is longer than at least one other interframe space interval used in the wireless network. Low latency transmissions are allowed during long interframe space intervals. The method further includes wirelessly transmitting the request frame and wirelessly transmitting one or more frames using the long interframe space interval after wirelessly transmitting the request frame.

Another aspect of the present disclosure generally relates to wireless communications, and more specifically, relates to using an enhanced reverse direction protocol to allow low latency transmission in a wireless network.

According to some embodiments, the reverse direction of protocol of the Institute of Electrical and Electronics Engineers (IEEE) 802.11be standard is enhanced to allow low latency transmission without channel sensing. Embodiments may improve latency by providing low latency transmission stations the opportunity to transmit data (e.g., emergency data) without having to compete for channel access or by allowing continuous data transmission when using the reverse direction protocol.

An embodiment is a method performed by a wireless device functioning as a first station in a wireless network. The method includes wirelessly receiving a frame from a second station in the wireless network, wherein the frame includes a low latency transmission indication indicating that the first station is allowed to sublease a transmission opportunity to wirelessly transmit a data frame to the second station during the transmission opportunity and responsive to determining that the frame includes the low latency transmission indication, wirelessly transmitting a combined block acknowledgement and data frame to the second station during the transmission opportunity.

For purposes of illustration, various embodiments are described herein in the context of wireless networks that are based on IEEE 802.11 standards and using terminology and concepts thereof. Those skilled in the art will appreciate that the embodiments disclosed herein can be modified/adapted for use in other types of wireless networks.

In the following detailed description, only certain embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

FIG. 1 shows a wireless local area network (WLAN) 100 with a basic service set (BSS) 102 that includes a plurality of wireless devices 104 (sometimes referred to as WLAN devices 104). Each of the wireless devices 104 may include a medium access control (MAC) layer and a physical (PHY) layer according to an IEEE (Institute of Electrical and Electronics Engineers) standard 802.11, including one or more of the amendments (e.g., 802.11a/b/g/n/p/ac/ax/bd/be). In one embodiment, the MAC layer of a wireless device 104 may initiate transmission of a frame to another wireless device 104 by passing a PHY-TXSTART.request (TXVECTOR) to the PHY layer. The TXVECTOR provides parameters for generating and/or transmitting a corresponding frame. Similarly, a PHY layer of a receiving wireless device may generate an RXVECTOR, which includes parameters of a received frame and is passed to a MAC layer for processing.

The plurality of wireless devices 104 may include a wireless device 104A that is an access point (sometimes referred to as an AP station or AP STA) and the other wireless devices 104$B_1$-104$B_4$ that are non-AP stations (sometimes referred to as non-AP STAs). Alternatively, all the plurality of wireless devices 104 may be non-AP STAs in an ad-hoc networking environment. In general, the AP STA (e.g., wireless device 104A) and the non-AP STAs (e.g., wireless devices 104$B_1$-104$B_4$) may be collectively referred to as STAs. However, for ease of description, only the non-AP STAs may be referred to as STAs. Although shown with four non-AP STAs (e.g., the wireless devices 104$B_1$-104$B_4$), the WLAN 100 may include any number of non-AP STAs (e.g., one or more wireless devices 104B).

Figure 2:
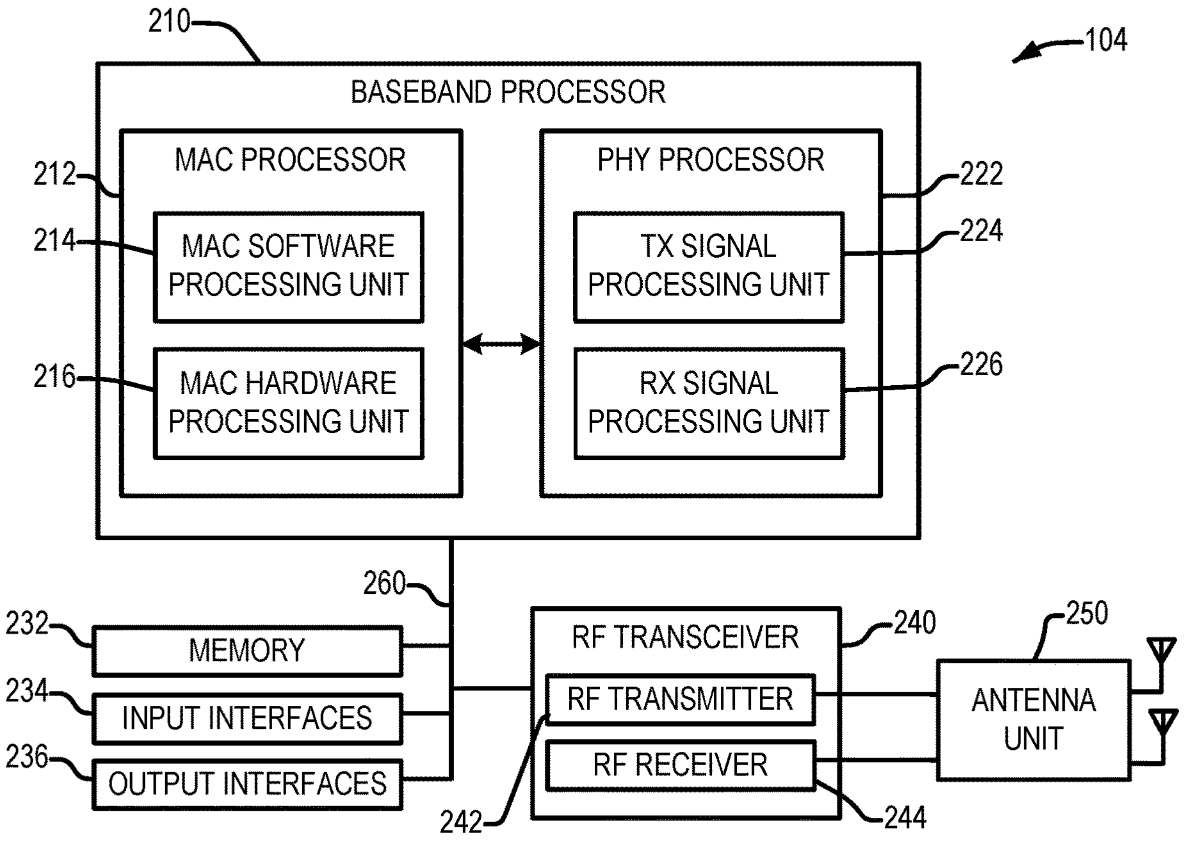
FIG. 2 is a schematic diagram of a wireless device, in accordance with some embodiments of the present disclosure.

FIG. 2 illustrates a schematic block diagram of a wireless device 104, according to an embodiment. The wireless device 104 may be the wireless device 104A (i.e., the AP of the WLAN 100) or any of the wireless devices 104$B_1$-104$B_4$ in FIG. 1. The wireless device 104 includes a baseband processor 210, a radio frequency (RF) transceiver 240, an antenna unit 250, a storage device (e.g., memory device) 232, one or more input interfaces 234, and one or more output interfaces 236. The baseband processor 210, the storage device 232, the input interfaces 234, the output interfaces 236, and the RF transceiver 240 may communicate with each other via a bus 260.

The baseband processor 210 performs baseband signal processing and includes a MAC processor 212 and a PHY processor 222. The baseband processor 210 may utilize the memory 232, which may include a non-transitory computer/machine readable medium having software (e.g., computer/machine programing instructions) and data stored therein.

In an embodiment, the MAC processor 212 includes a MAC software processing unit 214 and a MAC hardware processing unit 216. The MAC software processing unit 214 may implement a first plurality of functions of the MAC layer by executing MAC software, which may be included in the software stored in the storage device 232. The MAC hardware processing unit 216 may implement a second plurality of functions of the MAC layer in special-purpose hardware. However, the MAC processor 212 is not limited thereto. For example, the MAC processor 212 may be configured to perform the first and second plurality of functions entirely in software or entirely in hardware according to an implementation.

The PHY processor 222 includes a transmitting (TX) signal processing unit (SPU) 224 and a receiving (RX) SPU 226. The PHY processor 222 implements a plurality of functions of the PHY layer. These functions may be performed in software, hardware, or a combination thereof according to an implementation.

Functions performed by the transmitting SPU 224 may include one or more of Forward Error Correction (FEC) encoding, stream parsing into one or more spatial streams, diversity encoding of the spatial streams into a plurality of space-time streams, spatial mapping of the space-time streams to transmit chains, inverse Fourier Transform (iFT) computation, Cyclic Prefix (CP) insertion to create a Guard Interval (GI), and the like. Functions performed by the receiving SPU 226 may include inverses of the functions performed by the transmitting SPU 224, such as GI removal, Fourier Transform computation, and the like.

The RF transceiver 240 includes an RF transmitter 242 and an RF receiver 244. The RF transceiver 240 is configured to transmit first information received from the baseband processor 210 to the WLAN 100 (e.g., to another WLAN device 104 of the WLAN 100) and provide second information received from the WLAN 100 (e.g., from another WLAN device 104 of the WLAN 100) to the baseband processor 210.

The antenna unit 250 includes one or more antennas. When Multiple-Input Multiple-Output (MIMO) or Multi-User MIMO (MU-MIMO) is used, the antenna unit 250 may include a plurality of antennas. In an embodiment, the antennas in the antenna unit 250 may operate as a beamformed antenna array. In an embodiment, the antennas in the antenna unit 250 may be directional antennas, which may be fixed or steerable.

The input interfaces 234 receive information from a user, and the output interfaces 236 output information to the user. The input interfaces 234 may include one or more of a keyboard, keypad, mouse, touchscreen, microphone, and the like. The output interfaces 236 may include one or more of a display device, touch screen, speaker, and the like.

As described herein, many functions of the WLAN device 104 may be implemented in either hardware or software.

Which functions are implemented in software and which functions are implemented in hardware will vary according to constraints imposed on a design. The constraints may include one or more of design cost, manufacturing cost, time to market, power consumption, available semiconductor technology, etc.

As described herein, a wide variety of electronic devices, circuits, firmware, software, and combinations thereof may be used to implement the functions of the components of the WLAN device 104. Furthermore, the WLAN device 104 may include other components, such as application processors, storage interfaces, clock generator circuits, power supply circuits, and the like, which have been omitted in the interest of brevity.

Figure 3A:
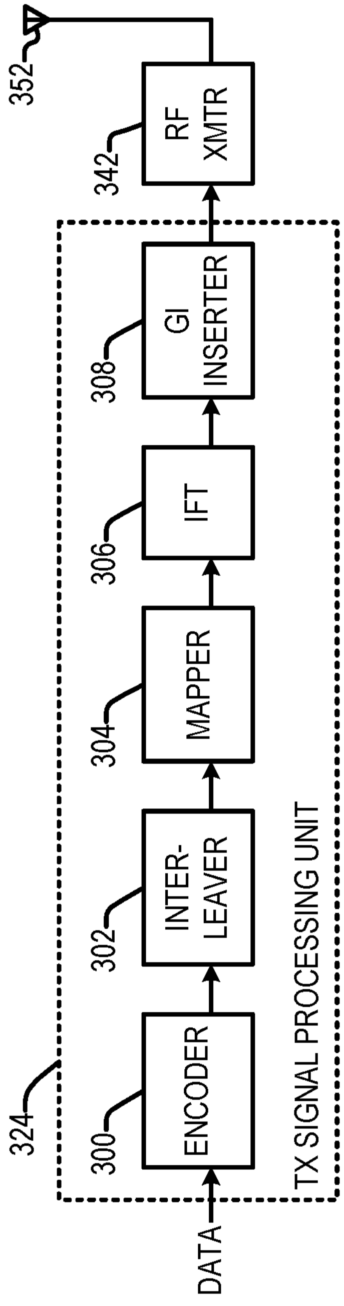
FIG. 3A illustrates components of a wireless device configured to transmit data, in accordance with some embodiments of the present disclosure.

FIG. 3A illustrates components of a WLAN device 104 configured to transmit data according to an embodiment, including a transmitting (Tx) SPU (TxSP) 324, an RF transmitter 342, and an antenna 352. In an embodiment, the TxSP 324, the RF transmitter 342, and the antenna 352 correspond to the transmitting SPU 224, the RF transmitter 242, and an antenna of the antenna unit 250 of FIG. 2, respectively.

The TxSP 324 includes an encoder 300, an interleaver 302, a mapper 304, an inverse Fourier transformer (IFT) 306, and a guard interval (GI) inserter 308.

The encoder 300 receives and encodes input data. In an embodiment, the encoder 300 includes a forward error correction (FEC) encoder. The FEC encoder may include a binary convolution code (BCC) encoder followed by a puncturing device. The FEC encoder may include a low-density parity-check (LDPC) encoder.

The TxSP 324 may further include a scrambler for scrambling the input data before the encoding is performed by the encoder 300 to reduce the probability of long sequences of 0s or 1s. When the encoder 300 performs the BCC encoding, the TxSP 324 may further include an encoder parser for demultiplexing the scrambled bits among a plurality of BCC encoders. If LDPC encoding is used in the encoder, the TxSP 324 may not use the encoder parser.

The interleaver 302 interleaves the bits of each stream output from the encoder 300 to change an order of bits therein. The interleaver 302 may apply the interleaving only when the encoder 300 performs BCC encoding and otherwise may output the stream output from the encoder 300 without changing the order of the bits therein.

The mapper 304 maps the sequence of bits output from the interleaver 302 to constellation points. If the encoder 300 performed LDPC encoding, the mapper 304 may also perform LDPC tone mapping in addition to constellation mapping.

When the TxSP 324 performs a MIMO or MU-MIMO transmission, the TxSP 324 may include a plurality of interleavers 302 and a plurality of mappers 304 according to a number of spatial streams (NSS) of the transmission. The TxSP 324 may further include a stream parser for dividing the output of the encoder 300 into blocks and may respectively send the blocks to different interleavers 302 or mappers 304. The TxSP 324 may further include a space-time block code (STBC) encoder for spreading the constellation points from the spatial streams into a number of space-time streams (NSTS) and a spatial mapper for mapping the space-time streams to transmit chains. The spatial mapper may use direct mapping, spatial expansion, or beamforming.

The IFT 306 converts a block of the constellation points output from the mapper 304 (or, when MIMO or MU-MIMO is performed, the spatial mapper) to a time domain block (i.e., a symbol) by using an inverse discrete Fourier transform (IDFT) or an inverse fast Fourier transform (IFFT). If the STBC encoder and the spatial mapper are used, the IFT 306 may be provided for each transmit chain.

When the TxSP 324 performs a MIMO or MU-MIMO transmission, the TxSP 324 may insert cyclic shift diversities (CSDs) to prevent unintentional beamforming. The TxSP 324 may perform the insertion of the CSD before or after the IFT 306. The CSD may be specified per transmit chain or may be specified per space-time stream. Alternatively, the CSD may be applied as a part of the spatial mapper.

When the TxSP 324 performs a MIMO or MU-MIMO transmission, some blocks before the spatial mapper may be provided for each user.

The GI inserter 308 prepends a GI to each symbol produced by the IFT 306. Each GI may include a Cyclic Prefix (CP) corresponding to a repeated portion of the end of the symbol that the GI precedes. The TxSP 324 may optionally perform windowing to smooth edges of each symbol after inserting the GI.

The RF transmitter 342 converts the symbols into an RF signal and transmits the RF signal via the antenna 352. When the TxSP 324 performs a MIMO or MU-MIMO transmission, the GI inserter 308 and the RF transmitter 342 may be provided for each transmit chain.

Figure 3B:
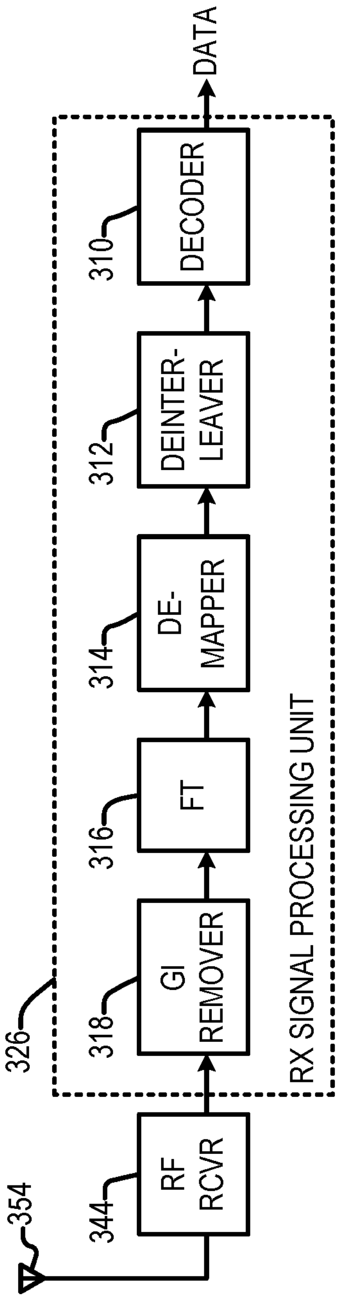
FIG. 3B illustrates components of a wireless device configured to receive data, in accordance with some embodiments of the present disclosure.

FIG. 3B illustrates components of a WLAN device 104 configured to receive data according to an embodiment, including a Receiver (Rx) SPU (RxSP) 326, an RF receiver 344, and an antenna 354. In an embodiment, the RxSP 326, RF receiver 344, and antenna 354 may correspond to the receiving SPU 226, the RF receiver 244, and an antenna of the antenna unit 250 of FIG. 2, respectively.

The RxSP 326 includes a GI remover 318, a Fourier transformer (FT) 316, a demapper 314, a deinterleaver 312, and a decoder 310.

The RF receiver 344 receives an RF signal via the antenna 354 and converts the RF signal into symbols. The GI remover 318 removes the GI from each of the symbols. When the received transmission is a MIMO or MU-MIMO transmission, the RF receiver 344 and the GI remover 318 may be provided for each receive chain.

The FT 316 converts each symbol (that is, each time domain block) into a frequency domain block of constellation points by using a discrete Fourier transform (DFT) or a fast Fourier transform (FFT). The FT 316 may be provided for each receive chain.

When the received transmission is the MIMO or MU-MIMO transmission, the RxSP 326 may include a spatial demapper for converting the respective outputs of the FTs 316 of the receiver chains to constellation points of a plurality of space-time streams, and an STBC decoder for despreading the constellation points from the space-time streams into one or more spatial streams.

The demapper 314 demaps the constellation points output from the FT 316 or the STBC decoder to bit streams. If the received transmission was encoded using LDPC encoding, the demapper 314 may further perform LDPC tone demapping before performing the constellation demapping.

The deinterleaver 312 deinterleaves the bits of each stream output from the demapper 314. The deinterleaver 312 may perform the deinterleaving only when the received transmission was encoded using BCC encoding, and otherwise may output the stream output by the demapper 314 without performing deinterleaving.

When the received transmission is the MIMO or MU-MIMO transmission, the RxSP 326 may use a plurality of demappers 314 and a plurality of deinterleavers 312 corresponding to the number of spatial streams of the transmission. In this case, the RxSP 326 may further include a stream deparser for combining the streams output from the deinterleavers 312.

The decoder 310 decodes the streams output from the deinterleaver 312 or the stream deparser. In an embodiment, the decoder 310 includes an FEC decoder. The FEC decoder may include a BCC decoder or an LDPC decoder.

The RxSP 326 may further include a descrambler for descrambling the decoded data. When the decoder 310 performs BCC decoding, the RxSP 326 may further include an encoder deparser for multiplexing the data decoded by a plurality of BCC decoders. When the decoder 310 performs the LDPC decoding, the RxSP 326 may not use the encoder deparser.

Before making a transmission, wireless devices such as wireless device 104 will assess the availability of the wireless medium using Clear Channel Assessment (CCA). If the medium is occupied, CCA may determine that it is busy, while if the medium is available, CCA determines that it is idle.

The PHY entity for IEEE 802.11 is based on Orthogonal Frequency Division Multiplexing (OFDM) or Orthogonal Frequency Division Multiple Access (OFDMA). In either OFDM or OFDMA Physical (PHY) layers, a STA (e.g., a wireless device 104) is capable of transmitting and receiving Physical Layer (PHY) Protocol Data Units (PPDUs) that are compliant with the mandatory PHY specifications. A PHY specification defines a set of Modulation and Coding Schemes (MCS) and a maximum number of spatial streams. Some PHY entities define downlink (DL) and uplink (UL) Multi-User (MU) transmissions having a maximum number of space-time streams (STS) per user and employing up to a predetermined total number of STSs. A PHY entity may provide support for 10 Megahertz (MHz), 20 MHz, 40 MHz, 80 MHz, 160 MHz, 240 MHz, and 320 MHz contiguous channel widths and support for an 80+80, 80+160 MHz, and 160+160 MHz non-contiguous channel width. Each channel includes a plurality of subcarriers, which may also be referred to as tones. A PHY entity may define signaling fields denoted as Legacy Signal (L-SIG), Signal A (SIG-A), and Signal B (SIG-B), and the like within a PPDU by which some necessary information about PHY Service Data Unit (PSDU) attributes are communicated. The descriptions below, for sake of completeness and brevity, refer to OFDM-based 802.11 technology. Unless otherwise indicated, a station refers to a non-AP STA.

Figure 4:
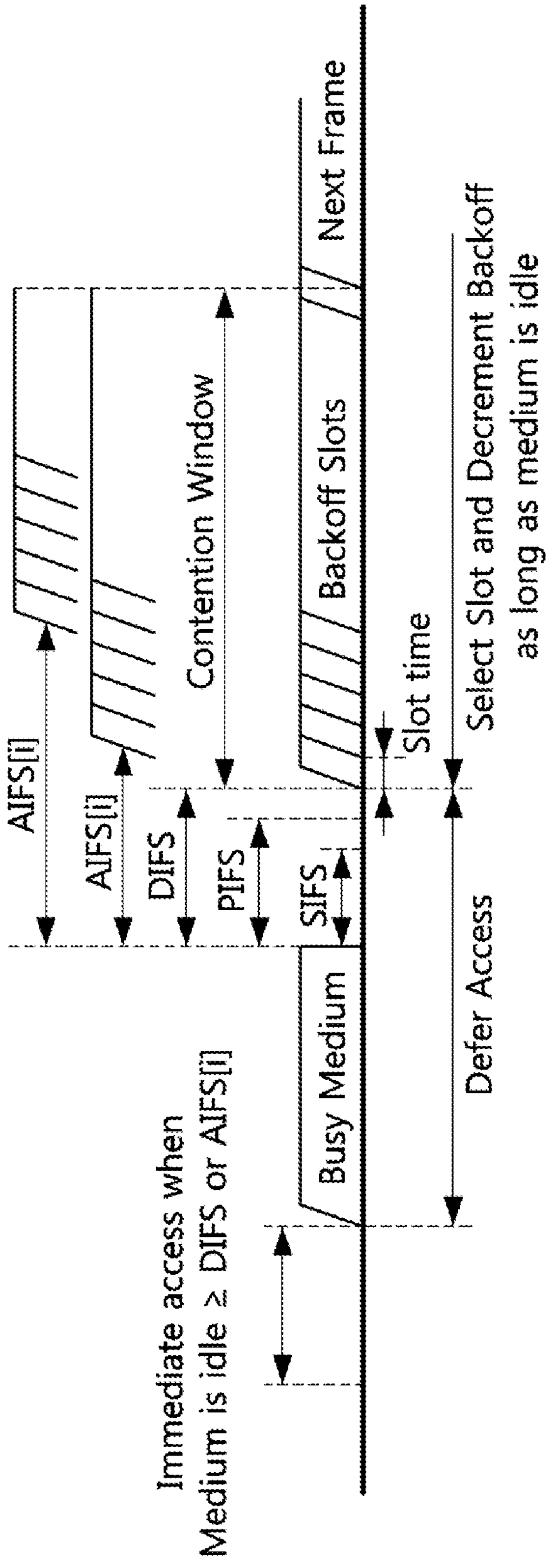
FIG. 4 illustrates Inter-Frame Space (IFS) relationships, in accordance with some embodiments of the present disclosure.

FIG. 4 illustrates Inter-Frame Space (IFS) relationships. In particular, FIG. 4 illustrates a Short IFS (SIFS), a Point Coordination Function (PCF) IFS (PIFS), a Distributed Coordination Function (DCF) IFS (DIFS), and an Arbitration IFSs corresponding to an Access Category (AC) 'i' (AIFS[i]). FIG. 4 also illustrates a slot time and a data frame is used for transmission of data forwarded to a higher layer. As shown, a WLAN device 104 transmits the data frame after performing backoff if a DIFS has elapsed during which the medium has been idle.

A management frame may be used for exchanging management information, which is not forwarded to the higher layer. Subtype frames of the management frame include a beacon frame, an association request/response frame, a probe request/response frame, and an authentication request/response frame.

A control frame may be used for controlling access to the medium. Subtype frames of the control frame include a request to send (RTS) frame, a clear to send (CTS) frame, and an acknowledgement (ACK) frame.

When the control frame is not a response frame of another frame, the WLAN device 104 transmits the control frame after performing backoff if a DIFS has elapsed during which the medium has been idle. When the control frame is the response frame of another frame, the WLAN device 104 transmits the control frame after a SIFS has elapsed without performing backoff or checking whether the medium is idle.

A WLAN device 104 that supports Quality of Service (QoS) functionality (that is, a QoS STA) may transmit the frame after performing backoff if an AIFS for an associated access category (AC) (i.e., AIFS[AC]) has elapsed. When transmitted by the QoS STA, any of the data frame, the management frame, and the control frame, which is not the response frame, may use the AIFS[AC] of the AC of the transmitted frame.

A WLAN device 104 may perform a backoff procedure when the WLAN device 104 that is ready to transfer a frame finds the medium busy. The backoff procedure includes determining a random backoff time composed of N backoff slots, where each backoff slot has a duration equal to a slot time and N being an integer number greater than or equal to zero. The backoff time may be determined according to a length of a Contention Window (CW). In an embodiment, the backoff time may be determined according to an AC of the frame. All backoff slots occur following a DIFS or Extended IFS (EIFS) period during which the medium is determined to be idle for the duration of the period.

When the WLAN device 104 detects no medium activity for the duration of a particular backoff slot, the backoff procedure shall decrement the backoff time by the slot time. When the WLAN device 104 determines that the medium is busy during a backoff slot, the backoff procedure is suspended until the medium is again determined to be idle for the duration of a DIFS or EIFS period. The WLAN device 104 may perform transmission or retransmission of the frame when the backoff timer reaches zero.

The backoff procedure operates so that when multiple WLAN devices 104 are deferring and execute the backoff procedure, each WLAN device 104 may select a backoff time using a random function and the WLAN device 104 that selects the smallest backoff time may win the contention, reducing the probability of a collision.

Figure 5:
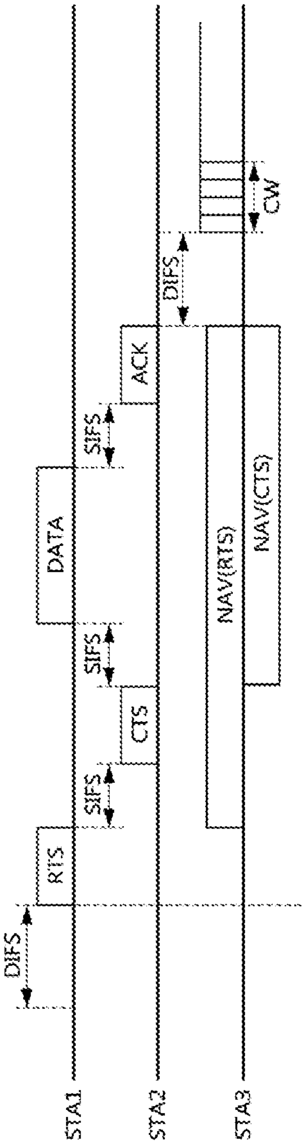
FIG. 5 illustrates a Carrier Sense Multiple Access/Collision Avoidance (CSMA/CA) based frame transmission procedure, in accordance with some embodiments of the present disclosure.

FIG. 5 illustrates a Carrier Sense Multiple Access/Collision Avoidance (CSMA/CA) based frame transmission procedure for avoiding collision between frames in a channel according to an embodiment. FIG. 5 shows a first station STA1 transmitting data, a second station STA2 receiving the data, and a third station STA3 that may be located in an area where a frame transmitted from the STA1 can be received, a frame transmitted from the second station STA2 can be received, or both can be received. The stations STA1, STA2, and STA3 may be WLAN devices 104 of FIG. 1.

The station STA1 may determine whether the channel is busy by carrier sensing. The station STA1 may determine channel occupation/status based on an energy level in the channel or an autocorrelation of signals in the channel, or may determine the channel occupation by using a network allocation vector (NAV) timer.

After determining that the channel is not used by other devices (that is, that the channel is IDLE) during a DIFS (and performing backoff if required), the station STA1 may transmit a Request-To-Send (RTS) frame to the station STA2. Upon receiving the RTS frame, after a SIFS the station STA2 may transmit a Clear-To-Send (CTS) frame as a response to the RTS frame. If Dual-CTS is enabled and the station STA2 is an AP, the AP may send two CTS frames in response to the RTS frame (e.g., a first CTS frame in a non-High Throughput format and a second CTS frame in the HT format).

When the station STA3 receives the RTS frame, it may set a NAV timer of the station STA3 for a transmission duration of subsequently transmitted frames (for example, a duration of SIFS+CTS frame duration+SIFS+data frame duration+SIFS+ACK frame duration) using duration information included in the RTS frame. When the station STA3 receives the CTS frame, it may set the NAV timer of the station STA3 for a transmission duration of subsequently transmitted frames using duration information included in the CTS frame. Upon receiving a new frame before the NAV timer expires, the station STA3 may update the NAV timer of the station STA3 by using duration information included in the new frame. The station STA3 does not attempt to access the channel until the NAV timer expires.

When the station STA1 receives the CTS frame from the station STA2, it may transmit a data frame to the station STA2 after a SIFS period elapses from a time when the CTS frame has been completely received. Upon successfully receiving the data frame, the station STA2 may transmit an ACK frame as a response to the data frame after a SIFS period elapses.

When the NAV timer expires, the third station STA3 may determine whether the channel is busy using the carrier sensing. Upon determining that the channel is not used by other devices during a DIFS period after the NAV timer has expired, the station STA3 may attempt to access the channel after a contention window elapses according to a backoff process.

When Dual-CTS is enabled, a station that has obtained a transmission opportunity (TXOP) and that has no data to transmit may transmit a CF-End frame to cut short the TXOP. An AP receiving a CF-End frame having a Basic Service Set Identifier (BSSID) of the AP as a destination address may respond by transmitting two more CF-End frames: a first CF-End frame using Space Time Block Coding (STBC) and a second CF-End frame using non-STBC. A station receiving a CF-End frame resets its NAV timer to 0 at the end of the PPDU containing the CF-End frame. FIG. 5 shows the station STA2 transmitting an ACK frame to acknowledge the successful reception of a frame by the recipient.

With clear demand for higher peak throughput/capacity in a WLAN, a new working group has been assembled to generate an amendment to IEEE 802.11. This amendment is called IEEE 802.11be (i.e., Extreme High Throughput (EHT)) and was created to support an increase to the peak PHY rate of a corresponding WLAN. Considering IEEE 802.11b through 802.11ac, the peak PHY rate has been increased by 5× to 11× as shown in FIG. 6, which presents a table 600 comparing various iterations of IEEE 802.11. In case of IEEE 802.11ax, the 802.11ax working group focused on improving efficiency, not peak PHY rate in dense environments. The maximum PHY rate (A Gbps) and PHY rate enhancement (Bx) for IEEE 802.11be could rely on the highest MCS (e.g., 4,096 QAM and its code rate).

The focus of IEEE 802.11be is primarily on WLAN indoor and outdoor operation with stationary and pedestrian speeds in the 2.4, 5, and 6 GHz frequency bands. In addition to peak PHY rate, different candidate features are under discussion. These candidate features include (1) a 320 MHz bandwidth and a more efficient utilization of a non-contiguous spectrum, (2) multi-band/multi-channel aggregation and operation, (3) 16 spatial streams and Multiple Input Multiple Output (MIMO) protocol enhancements, (4) multi-Access Point (AP) Coordination (e.g., coordinated and joint transmission), (5) an enhanced link adaptation and retransmission protocol (e.g., Hybrid Automatic Repeat Request (HARD)), and (6) adaptation to regulatory rules specific to a 6 GHz spectrum.

Some features, such as increasing the bandwidth and the number of spatial streams, are solutions that have been proven to be effective in previous projects focused on increasing link throughput and on which feasibility demonstration is achievable.

With respect to operational bands (e.g., 2.4/5/6 GHz) for IEEE 802.11be, more than 1 GHz of additional unlicensed spectrum is likely to be available because the 6 GHz band (5.925-7.125 GHz) is being considered for unlicensed use. This would allow APs and STAs to become tri-band devices. Larger than 160 MHz data transmissions (e.g., 320 MHz) could be considered to increase the maximum PHY rate. For example, 320 MHz or 160+160 MHz data could be transmitted in the 6 GHz band. For example, 160+160 MHz data could be transmitted across the 5 and 6 GHz bands.

In some embodiments, a transmitting STA generates a PPDU frame and transmits it to a receiving STA. The receiving STA receives, detects, and processes the PPDU. The PPDU can be an EHT PPDU that includes a legacy part (e.g., a legacy short training field (L-STF), a legacy long training field (L-LTF), and a legacy signal (L-SIG) field), an EHT signal A field (EHT-SIG-A), an EHT signal B field (EHT-SIG-B), an EHT hybrid automatic repeat request field (EHT-HARQ), an EHT short training field (EHT-STF), an EHT long training field (EHT-LTF), and an EHT-DATA field. FIG. 7 includes a table 700, which describes fields of an EHT frame format. In particular, table 700 describes various fields that may be within the PHY preamble, data field, and midamble of an EHT frame format. For example, table 700 includes definitions 702, durations 704, Discrete Fourier transform (DFTs) periods 706, guard intervals (GIs) 708, and subcarrier spacings 710 for one or more of a legacy short training field (L-STF) 712, legacy long training field (L-LTF) 714, legacy signal field (L-SIG) 716, repeated L-SIG (RL-SIG) 718, universal signal field (U-SIG) 720, EHT signal field (EHT-SIG) 722, EHT hybrid automatic repeat request field (EHT-HARQ) 724, EHT short training field (EHT-STF) 726, EHT long training field (EHT-LTF) 728, EHT data field 730, and EHT midamble field (EHT-MA) 732.

The distributed nature of a channel access network, such as in IEEE 802.11 wireless networks, makes carrier sensing mechanisms important for collision free operation. The physical carrier sensing mechanism of one STA is responsible for detecting the transmissions of other STAs. However, it may be impossible to detect every single case in some circumstances. For example, one STA which may be a long distance away from another STA may see the medium as idle and begin transmitting a frame while the other STA is also transmitting. To overcome this hidden node, a network allocation vector (NAV) may be used. However, as wireless networks evolve to include simultaneous transmission/reception to/from multiple users within a single basic service set (BSS), such as uplink (UL)/downlink (DL) multi-user (MU) transmissions in a cascading manner, a mechanism may be needed to allow for such a situation. As used herein, a multi-user (MU) transmission refers to cases that multiple frames are transmitted to or from multiple STAs simultaneously using different resources. Examples of different resources are different frequency resources in OFDMA transmissions and different spatial streams in MU- MIMO transmissions. Therefore, DL-OFDMA, DL-MU-MIMO, UL-OFDMA, and UL-MU-MIMO are examples of MU transmissions.

Wireless network systems can rely on retransmission of media access control (MAC) protocol data units (MPDUs) when the transmitter (TX) does not receive an acknowledgement from the receiver (RX) or MPDUs are not successfully decoded by the receiver. Using an automatic repeat request (ARQ) approach, the receiver discards the last failed MPDU before receiving the newly retransmitted MPDU. With requirements of enhanced reliability and reduced latency, the wireless network system can evolve toward a hybrid ARQ (HARQ) approach.

There are two methods of HARQ processing. In a first type of HARQ scheme, also referred to as chase combining (CC) HARQ (CC-HARQ) scheme, signals to be retransmitted are the same as the signals that previously failed because all subpackets to be retransmitted use the same puncturing pattern. The puncturing is needed to remove some of the parity bits after encoding using an error-correction code. The reason why the same puncturing pattern is used with CC-HARQ is to generate a coded data sequence with forward error correction (FEC) and to make the receiver use a maximum-ratio combining (MRC) to combine the received, retransmitted bits with the same bits from the previous transmission. For example, information sequences are transmitted in packets with a fixed length. At a receiver, error correction and detection are carried out over the whole packet. However, the ARQ scheme may be inefficient in the presence of burst errors. To solve this more efficiently, subpackets are used. In subpacket transmissions, only those subpackets that include errors need to be retransmitted.

Since the receiver uses both the current and the previously received subpackets for decoding data, the error probability in decoding decreases as the number of used subpackets increases. The decoding process passes a cyclic redundancy check (CRC) and ends when the entire packet is decoded without error or the maximum number of subpackets is reached. In particular, this scheme operates on a stop-and-wait protocol such that if the receiver can decode the packet, it sends an acknowledgement (ACK) to the transmitter. When the transmitter receives an ACK successfully, it terminates the HAPQ transmission of the packet. If the receiver cannot decode the packet, it sends a negative acknowledgement (NAK) to the transmitter and the transmitter performs the retransmission process.

In a second type of HARQ scheme, also referred to as an incremental redundancy (IR) HARQ (IR-HARQ) scheme, different puncturing patterns are used for each subpacket such that the signal changes for each retransmitted subpacket in comparison to the originally transmitted subpacket. IR-HARQ alternatively uses two puncturing patterns for odd numbered and even numbered transmissions, respectively. The redundancy scheme of IR-HARQ improves the log likelihood ratio (LLR) of parity bit(s) in order to combine information sent across different transmissions due to requests and lowers the code rate as the additional subpacket is used. This results in a lower error rate of the subpacket in comparison to CC-HARQ. The puncturing pattern used in IR-HARQ is indicated by a subpacket identity (SPID) indication. The SPID of the first subpacket may always be set to 0 and all the systematic bits and the punctured parity bits are transmitted in the first subpacket. Self-decoding is possible when the receiving signal-to-noise ratio (SNR) environment is good (i.e., a high SNR). In some embodiments, subpackets with corresponding SPIDs to be transmitted are in increasing order of SPID but can be exchanged/switched except for the first SPID.

To improve WLAN systems, AP cooperation has been discussed as a possible technology to be adopted in IEEE 802.11be, where there is high level classification depending on various AP cooperation schemes. For example, there is a first type of cooperation scheme in which data for a user is sent from a single AP (sometimes referred to as "coordinated") and there is a second type of cooperation scheme in which data for a user is sent from multiple APs (sometimes referred to as "joint").

For the coordinated scheme, multiple APs are 1) transmitting on the same frequency resource based on coordination and forming spatial nulls to allow for simultaneous transmission from multiple APs or 2) transmitting on orthogonal frequency resources by coordinating and splitting the spectrum to use the spectrum more efficiently. For the joint scheme, multiple APs are transmitting jointly to a given user.

Figure 8:
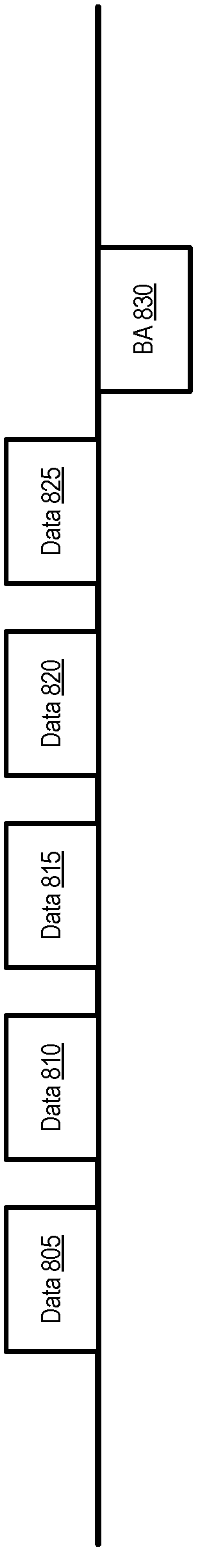
FIG. 8 is a diagram showing a non-aggregated transmission with block acknowledgement during a transmission opportunity, according to some embodiments.

The throughput of conventional WLANs can be improved using a TXOP transmission technique and a block acknowledgement technique, as shown in FIG. 8.

FIG. 8 is a diagram showing a non-aggregated transmission with block acknowledgement during a transmission opportunity, according to some embodiments.

In a distributed network environment, stations that have acquired a TXOP through medium access competition are guaranteed and contention-free channel access for a period of time. Data frames (e.g., MPDUs) can be continuously transmitted using SIFS or RIFS intervals without immediate acknowledgements. A block acknowledgement (ACK) frame can be used to acknowledge the data frames. The block ACK frame may include error information for the consecutively transmitted data frames in a bitmap format.

When transmitting data frames, the "more" bit of a data frame may be set to binary '1' to indicate that another data frame will immediately follow the current data frame without acknowledgement. The "more" bit of a data frame may be set to binary '0' to indicate the end of data transmission.

For example, as shown in the diagram, five consecutive data frames (i.e., data frames 805, 810, 815, 820, and 825) are transmitted using an interframe space interval (e.g., SIFS interval or RIFS interval). A block ACK frame 830 is transmitted to acknowledge the data frames.

Figure 9:
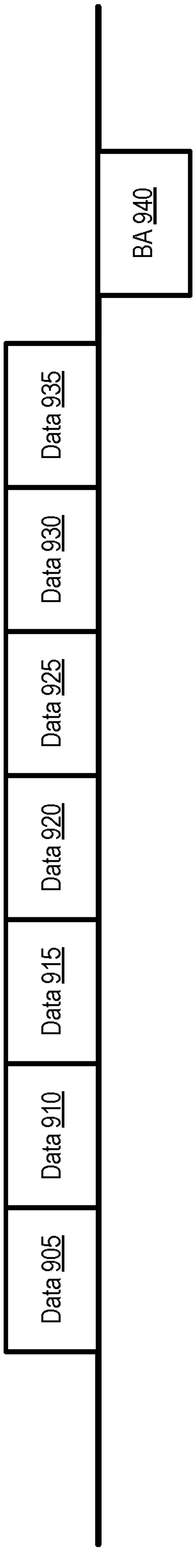
FIG. 9 is a diagram showing an aggregated transmission with block acknowledgement during a transmission opportunity, according to some embodiments.

Disadvantageously, the use of an interframe space interval increases overhead and unnecessarily reduces link throughput because competition with other stations is unnecessary during the TXOP interval. To resolve this problem, an aggregation technique can be used that transmits consecutive data frames without using an interframe space interval, as shown in FIG. 9. Data frames can be transmitted using aggregation by using an A-MSDU (aggregated MAC service data unit) scheme and/or an A-MPDU (aggregated MAC protocol data unit) scheme.

FIG. 9 is a diagram showing an aggregated transmission with block acknowledgement during a transmission opportunity, according to some embodiments.

As shown in the diagram, five consecutive data frames (i.e., data frames 905, 910, 915, 920, and 925) are transmitted without using an interframe space interval. A block ACK frame 930 is transmitted to acknowledge the data frames.

While the use of aggregation can improve the link throughput, low latency applications and stations cannot be guaranteed channel access opportunity in wireless networks where one station occupies channels and links for long periods of time (e.g., a TXOP interval).

As mentioned above, low latency transmission may be achieved by overlaying transmission during the transmission of other stations, but this may result in performance degradation caused by interference. Although it is possible to implement a protocol that forcibly interrupts the transmission of other stations to allow for low latency transmission, such protocol may be difficult to implement and control, and also conflicts with the WLAN's distributed competition control mechanism.

Figure 10:
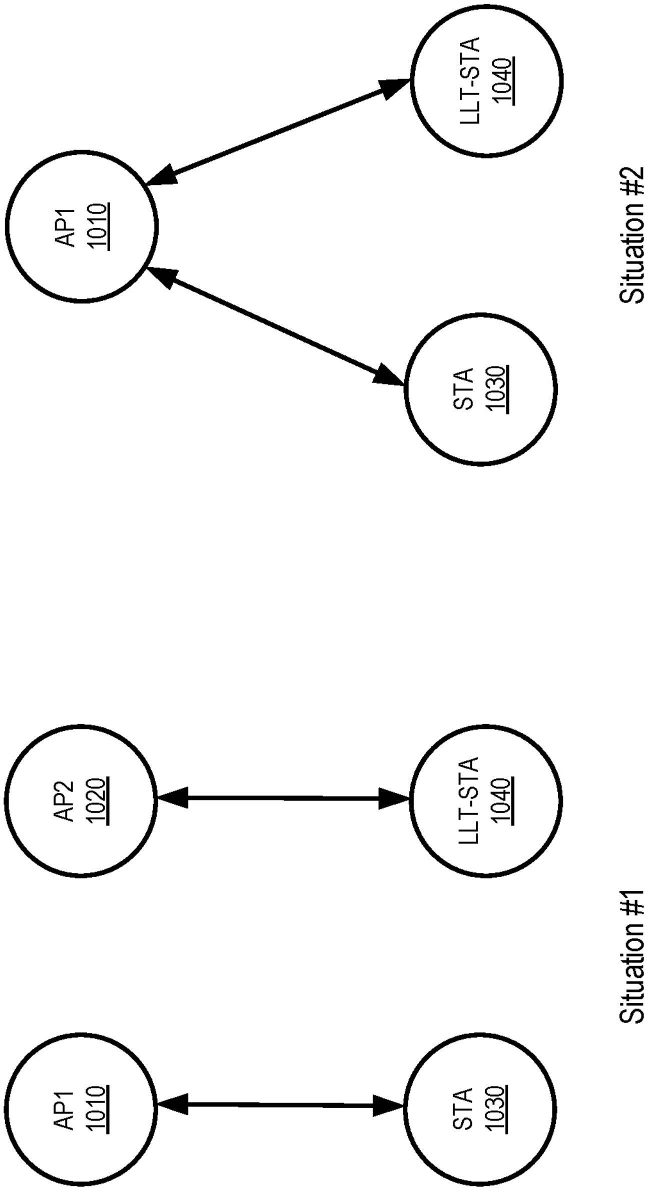
FIG. 10 is a diagram showing two scenarios in a wireless network, according to some embodiments.

The present disclosure may consider two different network scenarios as shown in FIG. 10.

FIG. 10 is a diagram showing two scenarios in a wireless network, according to some embodiments. As shown in the diagram, in scenario #1, a station (STA 1030) is associated with a first AP (AP1 1010) and a low latency transmission station (LLT-STA 1040) is associated with a second AP (AP2 1020). AP1 1010 and AP2 1020 may be neighbors operating in the same channel. In scenario #1, STA 1030 and LLT-STA 1040 may communicate with their respective APs at the same time. If STA 1030 occupies the channel for a long time, a problem arises that the latency of LLT-STA's 1040 transmission increases (because LLT-STA 1040 has to defer transmission until the normal STA 1030 completes its transmission).

As shown in the diagram, in situation #2, STA 1030 and LLT-STA 1040 are associated with the same AP (AP1 1010). If STA 1030 occupies the channel for a long time, the latency of the LLT-STA's 1040 transmission increases.

As will be described in further detail herein, embodiments use a LIFS interval and LIFS indication technique to allow low latency transmission between frames. If there is a low latency station in the basic service set and link, some channels and some sections of the link are not aggregated and transmitted using a LIFS interval. In this case, a non-aggregation transmission method may use a normal acknowledgement or a block acknowledgement to acknowledge data frames. A low latency transmission station may be a station that needs to transmit and/or receive data (e.g., emergency data) with low latency.

Figure 11:
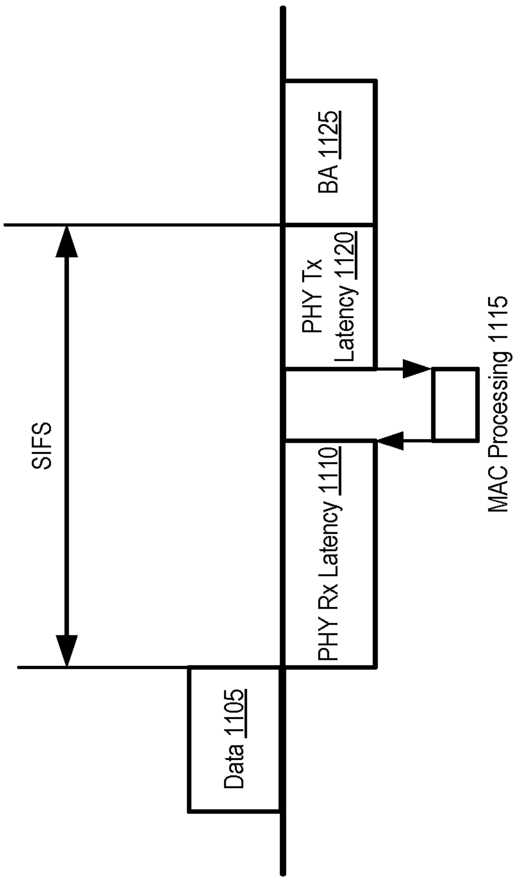
FIG. 11 is a diagram showing short interframe space (SIFS) and processing latencies, according to some embodiments.

FIG. 11 is a diagram showing SIFS and processing latencies, according to some embodiments. The SIFS interval is a time that is used for waiting for the physical layer (PHY) receive (RX) latency, MAC processing latency, and PHY transmit (TX) latency, as shown in FIG. 11. The SIFS is an interframe space that considers differences in implementation methods for different chip vendors. SIFS is used for request-to-send (RTS), clear-to-send (CTS), ACK, and fragmented continuous frame transmission. Carrier sensing or channel access is not performed during the SIFS interval.

As shown in the diagram, after a data frame 1105 is transmitted, there may be a PHY Rx latency 1110, a MAC processing latency 1115, and a PHY Tx latency 1120 before a block ACK frame 1125 can be transmitted. The SIFS interval takes into consideration these latencies. A LIFS interval may be longer than at least one other interframe space interval used in the wireless network. The LIFS interval should be long enough to allow LLT stations to transmit during the LIFS interval. In an embodiment, the LIFS interval is longer than a DIFS interval (e.g., longer than 32 μs). In an embodiment, the LIFS interval is in the range of tens of μs to hundreds of μs (a length that is long enough to transmit a packet).

Figure 12:
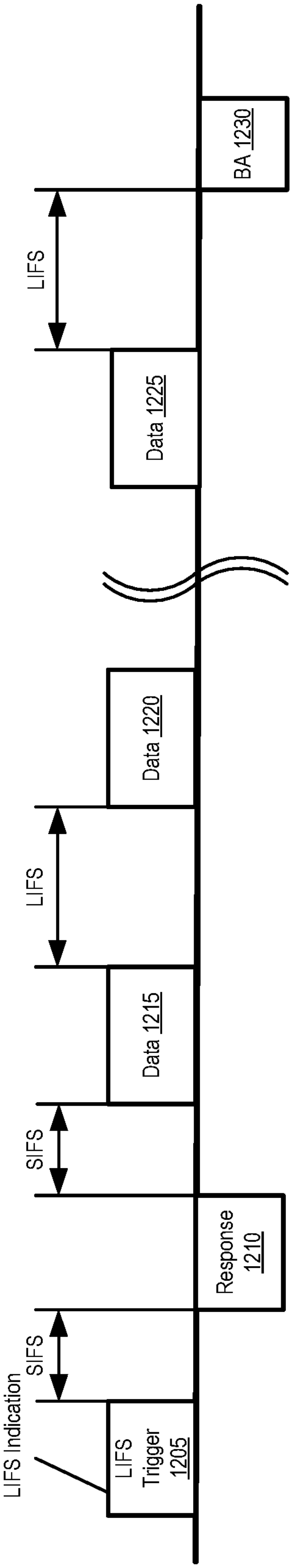
FIG. 12 is a diagram showing a long interframe space (LIFS) indication and transmission of frames using a LIFS interval, according to some embodiments.

FIG. 12 is a diagram showing a LIFS indication and transmission of frames using a LIFS interval, according to some embodiments.

As shown in the diagram, a first station may transmit a LIFS trigger frame 1205 that includes a LIFS indication. The LIFS indication may indicate that future frames are to be transmitted using a LIFS interval. In an embodiment, the LIFS indication includes a low latency transmission indicator (indicating that low latency transmission is allowed during the LIFS interval) and LIFS period information (e.g., information regarding how many LIFS intervals are allowed). In an embodiment, if it is confirmed that LIFS indication is transmitted and supported through a request/response handshake, it is transmitted at LIFS intervals when MPDU is transmitted during the TXOP interval. Although the diagram shows that the request frame is a LIFS trigger, in other embodiments, the request frame may be a new RTS frame.

After a SIFS interval from when the LIFS trigger frame 1205 was transmitted, a second station may transmit a response frame 1210 as a response to the LIFS trigger frame 1205. After another SIFS interval, the first station may transmit a data frame 1215. The first station may then transmit one or more additional data frames such as data frame 1220 and data frame 1225 using a LIFS interval (there is a LIFS interval between frame transmissions). After a LIFS interval from when the last data frame 1225 was transmitted, the second station may transmit a block ACK frame 1230 (to acknowledge the data frames).

Figure 13:
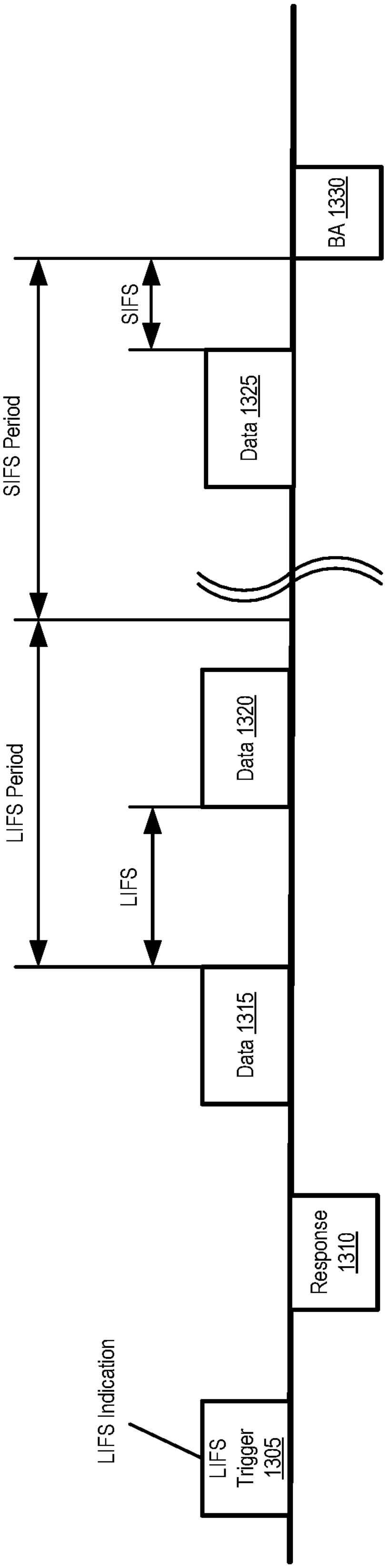
FIG. 13 is a diagram showing a LIFS indication and transmission of frames using both LIFS interval and SIFS interval, according to some embodiments.

FIG. 13 is a diagram showing a LIFS indication and transmission of frames using both LIFS interval and SIFS interval, according to some embodiments.

As shown in the diagram, a first station transmits a LIFS trigger frame 1305 that includes a LIFS indication. The LIFS indication may include information regarding a long interframe space period during which the LIFS interval is to be used and a SIFS period during which a SIFS interval is to be used.

After a SIFS interval from when the LIFS trigger frame 1305 was transmitted, a second station may transmit a response frame 1310 as a response to the LIFS trigger frame 1305. The first station may then transmit a data frame 1315. The first station may then transmit one or more additional data frames such as data frame 1320 using a LIFS interval during a LIFS period. Also, the first station may transmit one or more additional data frames such as data frame 1325 using a SIFS interval during a SIFS period. After a SIFS interval from when the last data frame 1325 was transmitted, the second station may transmit a block ACK frame 1330 (to acknowledge the data frames).

Low latency frames may be transmitted during LIFS intervals using different transmission modes. Four different transmission modes are described in further detail herein below.

Figure 14:
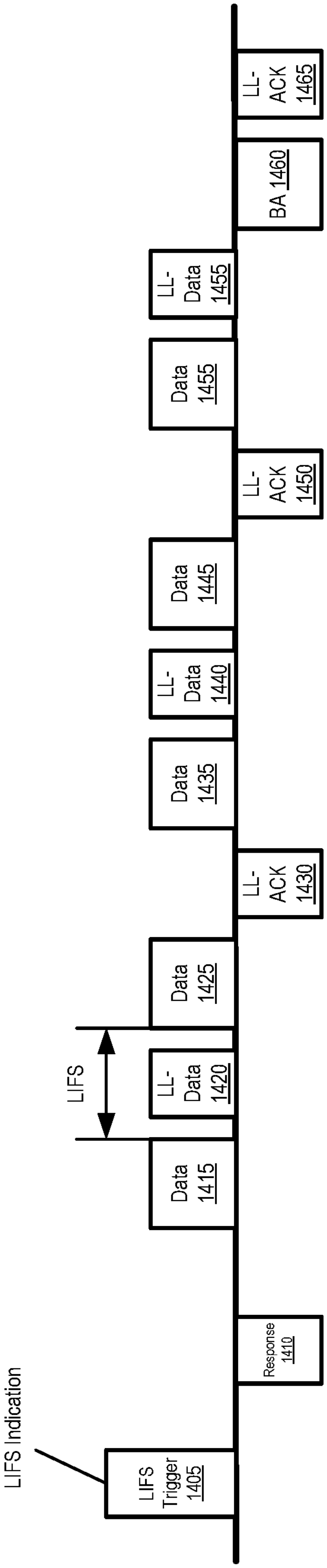
FIG. 14 is a diagram showing a first low latency transmission mode, according to some embodiments.

FIG. 14 is a diagram showing a first low latency transmission mode, according to some embodiments. With the first low latency transmission mode, a low latency data frame is transmitted during a particular LIFS interval, and a low latency ACK frame for the low latency data frame is transmitted during the next LIFS interval. For example, as shown in the diagram, a first station may transmit a LIFS trigger frame 1405 including a LIFS indication and a second station may transmit a response frame 1410 as a response to the LIFS trigger frame 1405. The first station may transmit data frame 1415, data frame 1425, data frame 1435, data frame 1445, and data frame 1455 using a LIFS interval. The second station may then transmit a block ACK frame 1460 using a LIFS interval.

During the LIFS interval between data frame 1415 and data frame 1425, a low latency (LL) data frame 1420 may be transmitted. During the LIFS interval between data frame 1425 and data frame 1435, a low latency ACK frame 1430 for low latency data frame 1420 (that acknowledges the low latency data frame 1420) may be transmitted. During the LIFS interval between data frame 1435 and data frame 1445, a low latency data frame 1440 may be transmitted. During the LIFS interval between data frame 1445 and data frame 1455, a low latency ACK frame 1450 for low latency data frame 1440 may be transmitted. During the LIFS interval between data frame 1455 and block ACK frame 1460, a low latency data frame 1455 may be transmitted. A low latency ACK frame 1465 for the low latency data frame 1455 may be transmitted after the block ACK frame 1460 is transmitted.

An advantage of the first low latency transmission mode is that it is simple to implement and allows for lower latency transmissions compared to conventional mechanisms. However, there is a data frame transmission latency between low latency frame transmissions.

Figure 15:
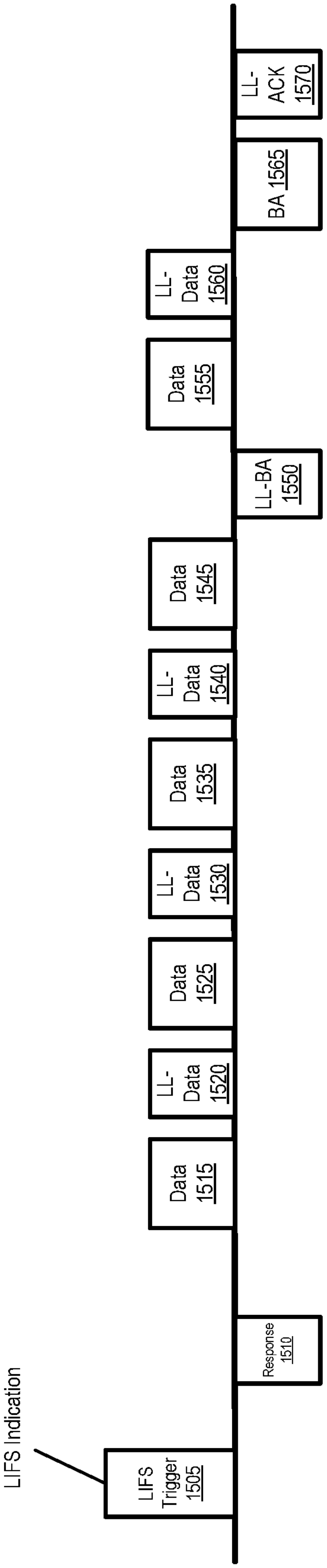
FIG. 15 is a diagram showing a second low latency transmission mode, according to some embodiments.

FIG. 15 is a diagram showing a second low latency transmission mode, according to some embodiments. With the second low latency transmission mode, low latency data frames are transmitting during multiple successive LIFS intervals, and then a low latency block ACK frame is transmitting during a LIFS interval that occurs after the multiple successive LIFS intervals. For example, as shown in the diagram, a first station may transmit a LIFS trigger frame 1505 including a LIFS indication and a second station may transmit a response frame 1510 as a response to the LIFS trigger frame 1505. The first station may transmit data frame 1515, data frame 1525, data frame 1535, data frame 1545, and data frame 1555 using a LIFS interval. The second station may transmit a block ACK frame 1565 using a LIFS interval.

During the LIFS interval between data frame 1515 and data frame 1525, a low latency data frame 1520 may be transmitted. During the LIFS interval between data frame 1525 and data frame 1535, another low latency data frame 1530 may be transmitted. During the LIFS interval between data frame 1535 and data frame 1545, another low latency data frame 1540 may be transmitted. During the LIFS interval between data frame 1545 and data frame 1555, a low latency block ACK frame 1550 for the low latency data frames may be transmitted. During the LIFS interval between data frame 1555 and the block ACK frame 1565, a low latency data frame 1560 may be transmitted. A low latency ACK frame 1570 for low latency data frame 1560 may be transmitted after the block ACK frame 1565 is transmitted.

An advantage of the second low latency transmission mode is that it is simple to implement. However, the use of a low latency block ACK frame may add latency.

Figure 16:
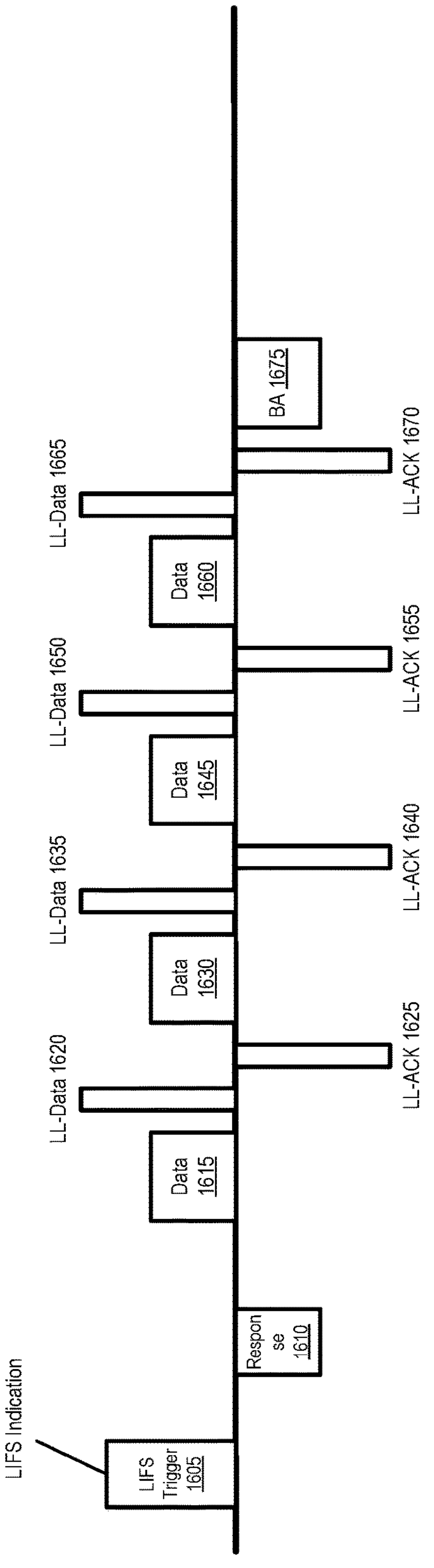
FIG. 16 is a diagram showing a third low latency transmission mode when a block acknowledgement mechanism is used to acknowledge data frames, according to some embodiments.

FIG. 16 is a diagram showing a third low latency transmission mode when a block acknowledgement mechanism is used to acknowledge data frames, according to some embodiments. With the third low latency transmission mode, a low latency data frame and a low latency ACK frame are transmitted during the same LIFS interval. For example, as shown in the diagram, a first station may transmit a LIFS trigger frame 1605 including a LIFS indication and a second station may transmit a response frame 1610 as a response to the LIFS trigger frame 1605. The first station may transmit data frame 1615, data frame 1630, data frame 1645, and data frame 1660 using a LIFS interval. The second station may then transmit a block ACK frame 1675 using a LIFS interval.

During the LIFS interval between data frame 1615 and data frame 1630, a low latency data frame 1620 and a low latency ACK frame 1625 for the low latency data frame 1620 may be transmitted. During the LIFS interval between data frame 1630 and data frame 1645, a low latency data frame 1635 and a low latency ACK frame 1640 for the low latency data frame 1635 may be transmitted. During the LIFS interval between data frame 1645 and data frame 1660, a low latency data frame 1650 and a low latency ACK frame 1655 for the low latency data frame 1650 may be transmitted. During the LIFS interval between data frame 1660 and block ACK frame 1675, a low latency data frame 1665 and a low latency ACK frame 1670 for the low latency data frame 1665 may be transmitted. In an embodiment, bandwidth extension is applied to the low latency frames (e.g., low latency data frames and/or low latency ACK frames) such that they are transmitted using a higher bandwidth than the bandwidth used to transmit the normal data frames.

Figure 17:
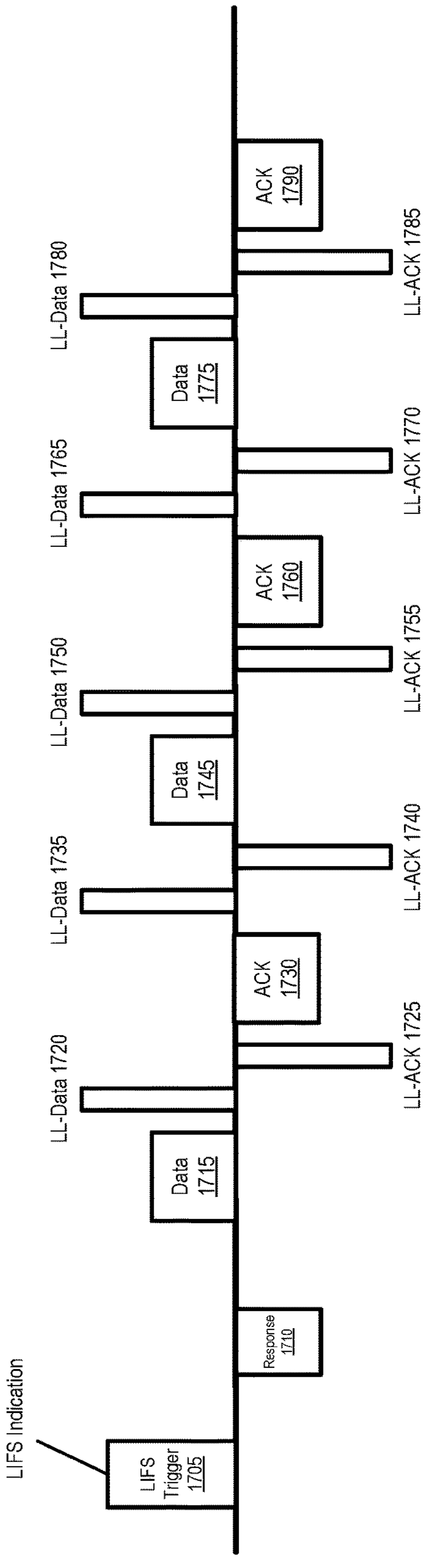
FIG. 17 is a diagram showing a third low latency transmission mode when a normal acknowledgement mechanism is used to acknowledge data frames, according to some embodiments.

FIG. 17 is a diagram showing a third low latency transmission mode when a normal acknowledgement mechanism is used to acknowledge data frames, according to some embodiments. As shown in the diagram, a first station may transmit a LIFS trigger frame 1705 including a LIFS indication and a second station may transmit a response frame 1710 as a response to the LIFS trigger frame 1705. The first station may transmit a data frame 1715 and the second station may transmit an ACK frame 1730 for data frame 1715 using a LIFS interval. The first station may then transmit another data frame 1745 using a LIFS interval and the second station may transmit an ACK frame 1760 for data frame 1745 using a LIFS interval. The first station may then transmit another data frame 1775 using a LIFS interval and the second station may transmit an ACK frame 1790 for data frame 1775 using a LIFS interval.

During the LIFS interval between data frame 1715 and ACK frame 1730, a low latency data frame 1720 and a low latency ACK frame 1725 for the low latency data frame 1720 may be transmitted. Similarly, during the LIFS interval between ACK frame 1730 and data frame 1745, a low latency data frame 1735 and a low latency ACK frame 1740 for the low latency data frame 1735 may be transmitted. Similarly, during the LIFS interval between data frame 1745 and ACK frame 1760, a low latency data frame 1750 and a low latency ACK frame 1755 for the low latency data frame 1750 may be transmitted. Similarly, during the LIFS interval between ACK frame 1760 and data frame 1775, a low latency data frame 1765 and a low latency ACK frame 1770 for the low latency data frame 1765 may be transmitted. Similarly, during the LIFS interval between data frame 1775 and ACK frame 1790, a low latency data frame 1780 and a low latency ACK frame 1785 for the low latency data frame 1780 may be transmitted. In an embodiment, bandwidth extension is applied to the low latency frames.

An advantage of the third low latency transmission mode is that the low latency frames can be transmitted with lower latency compared to the first low latency transmission mode and the second low latency transmission mode. However, it is more complicated, as bandwidth indication for bandwidth extension transmission and adjacent channel protection or very short time neighboring channel interference may be needed.

Figure 18:
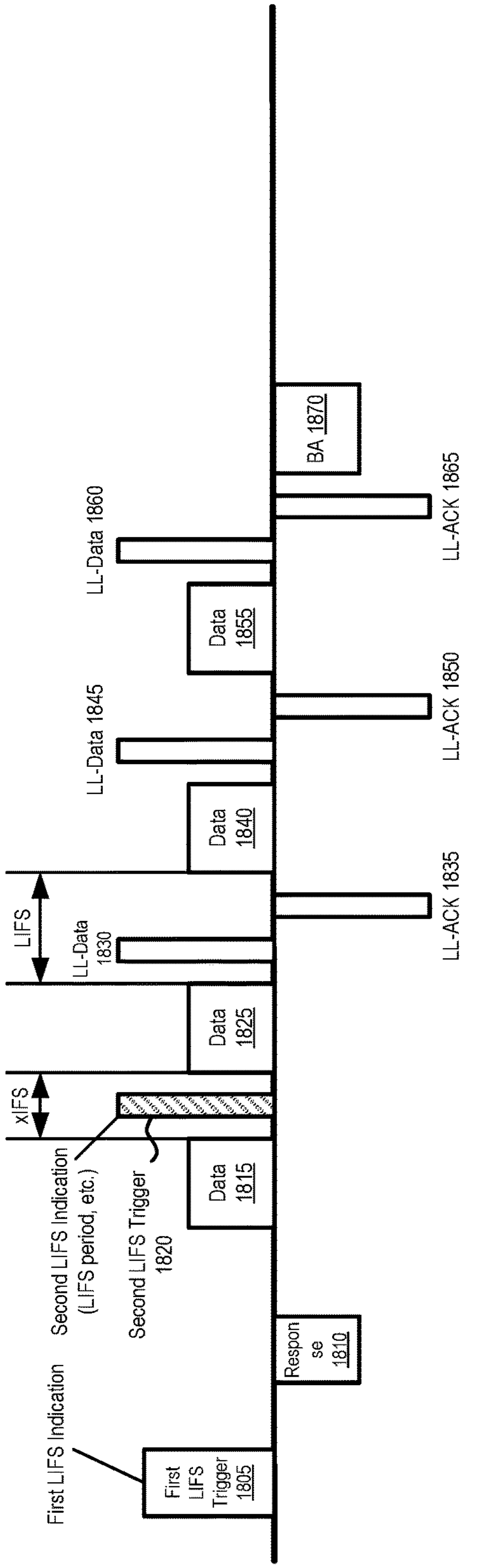
FIG. 18 is a diagram showing a fourth low latency transmission mode when a block acknowledgement mechanism is used to acknowledge data frames, according to some embodiments.

FIG. 18 is a diagram showing a fourth low latency transmission mode when a block acknowledgement mechanism is used to acknowledge data frames, according to some embodiments. With the fourth low latency transmission mode, a LIFS trigger frame may be transmitted during an interframe space interval to adjust the type of interframe space interval being used. For example, as shown in the diagram, a first station may transmit a first LIFS trigger frame 1805 including a first LIFS indication and a second station may transmit a response frame 1810 as a response to the first LIFS trigger frame 1805. The first station may transmit data frame 1815 and data frame 1825 using a xIFS interval. During the xIFS interval between data frame 1815 and data frame 1825, a second LIFS trigger frame 1820 including a second LIFS indication may be transmitted. The second LIFS indication may indicate that frames are to be transmitted using a LIFS interval. Accordingly, the first station may then transmit data frame 1825, data frame 1840, and data frame 1855 using a LIFS interval. The second station may transmit a block ACK frame 1870 using a LIFS interval.

During the LIFS interval between data frame 1825 and data frame 1840, a low latency data frame 1830 and a low latency ACK frame 1835 for the low latency data frame 1830 may be transmitted. During the LIFS interval between data frame 1840 and data frame 1855, a low latency data frame 1845 and a low latency ACK frame 1850 for the low latency data frame 1845 may be transmitted. During the LIFS interval between data frame 1855 and block ACK frame 1870, a low latency data frame 1860 and a low latency ACK frame 1865 for the low latency data frame 1860 may be transmitted. In an embodiment, bandwidth extension is applied to the low latency frames.

Figure 19:
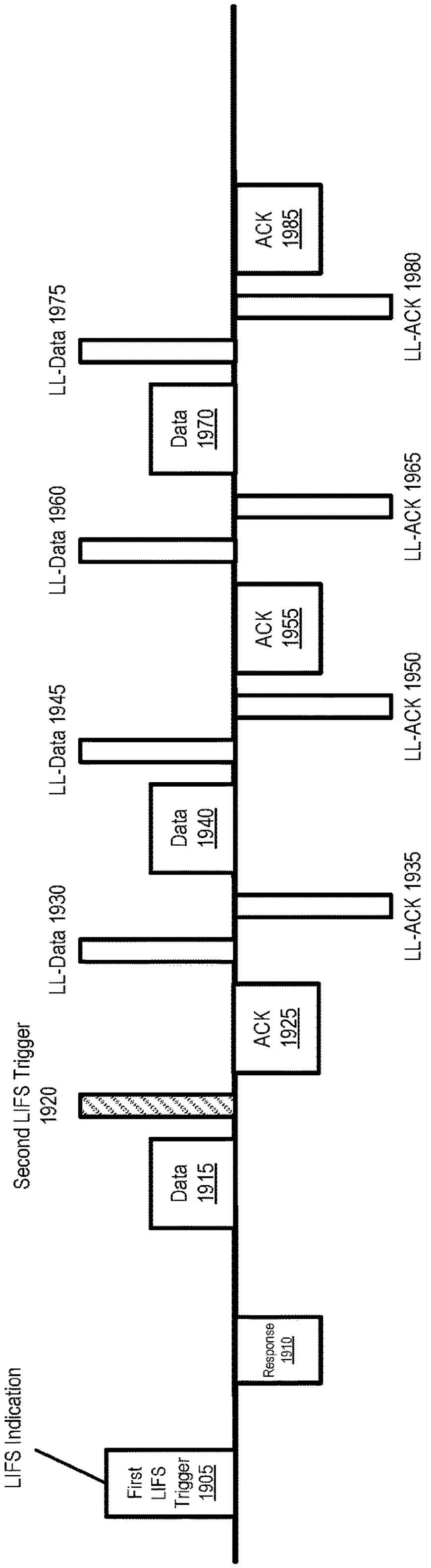
FIG. 19 is a diagram showing a fourth low latency transmission mode when a normal acknowledgement mechanism is used to acknowledge data frames, according to some embodiments.

FIG. 19 is a diagram showing a fourth low latency transmission mode when a normal acknowledgement mechanism is used to acknowledge data frames, according to some embodiments. As shown in the diagram, a first station may transmit a first LIFS trigger frame 1905 including a first LIFS indication and a second station transmits a response frame 1910 as a response to the first LIFS trigger frame 1905. The first station may then transmit data frame 1915 and the second station may transmit an ACK frame 1925 for the data frame 1915 using a xIFS interval. During the xIFS interval between data frame 1915 and ACK frame 1925, a second LIFS trigger frame 1920 including a second LIFS indication may be transmitted. The second LIFS indication may indicate that frames are to be transmitted using a LIFS interval. Accordingly, the first station may then transmit data frame 1940 using a LIFS interval and the second station may transmit an ACK frame 1955 for the data frame 1940 using a LIFS interval. The first station may then transmit data frame 1970 using a LIFS interval and the second station may transmit an ACK frame 1984 for the data frame 1970 using a LIFS interval.

During the LIFS interval between ACK frame 1925 and data frame 1940, a low latency data frame 1930 and a low latency ACK frame 1935 for the low latency data frame 1930 may be transmitted. During the LIFS interval between data frame 1940 and ACK frame 1955, a low latency data frame 1945 and a low latency ACK frame 1950 for the low latency data frame 1945 may be transmitted. During the LIFS interval between ACK frame 1955 and data frame 1970, a low latency data frame 1960 and a low latency ACK frame 1965 for the low latency data frame 1960 may be transmitted. During the LIFS interval between data frame 1970 and ACK frame 1985, a low latency data frame 1975 and a low latency ACK frame 1980 for the low latency data frame 1975 may be transmitted. In an embodiment, bandwidth extension is applied to the low latency frames.

With the fourth low latency transmission mode, the first LIFS trigger frame can trigger data frame transmission using a basic xIFS (e.g., SIFS). A second/subsequent LIFS trigger frame transmitted during a xIFS interval may be used to adjust the type of interframe space being used (e.g., from xIFS interval to LIFS interval). In this manner, the interframe space interval being used can be flexibly changed during the middle of the TXOP. In an embodiment, the second LIFS trigger frame only includes the legacy compatible part consisting of a preamble and L-SIG field to reduce the frame transmission time in the time domain. In an embodiment, the L-SIG field includes a LIFS indication instead of length and rate information. In an embodiment, If the LIFS interval is long enough, LIFS indication can be transmitted as part of a trigger frame in an EHT or 802.11ax format.

An advantage of the fourth low latency transmission mode is that channel/link utilization is improved because the use of a LIFS interval can be selectively activated, and interframe space can be adjusted, as needed. However, it is more complicated, as additional control logic (e.g., to adjust the interframe space interval being used) is needed.

The proposed method described above can be used with situation #1 (shown in FIG. 10) without changing the structure of the AP. However, in order to use the method with situation #2, the transmission and reception structure of the AP has to operate in parallel when considering the processing time for transmission and reception of frames. In an embodiment, a multi-link structure or OFDMA structure can be realized without structural change. For example, when not operating in multi-link mode, two links of the AP may be used for low latency transmission in the low latency mode. That is, one link may be used to process normal data frames and normal ACKs, and the other link may be used to process low latency data frames and low latency ACK frames.

Since LIFS may not be defined in the legacy wireless device, in an embodiment, NAV protection using L-SIG spoofing and the request/response frame of the present disclosure can be used to protect the legacy wireless device.

To support the proposed LIFS-based low latency transmission schemes, a new trigger frame may be defined. The structure of the existing trigger frame in IEEE 802.11ax is as shown in FIGS. 20-23. In an embodiment, when such a trigger frame format is used, it may operate without a response frame.

Figure 20:
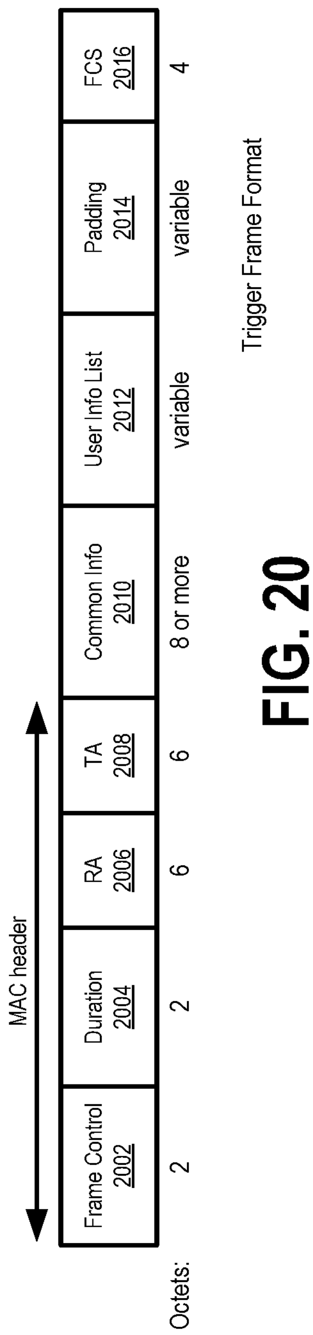
FIG. 20 is a diagram showing a trigger frame format in IEEE 802.11ax.

FIG. 20 is a diagram showing a trigger frame format in IEEE 802.11ax. As shown in the diagram, the trigger frame format includes a frame control field 2002, a duration field 2004, a RA (receiver address) field 2006, a TA (transmitter address) field 2008, a common info field 2010, a user info list field 2012, a padding field 2014, and a FCS (frame check sequence) field 2016.

Figure 21:
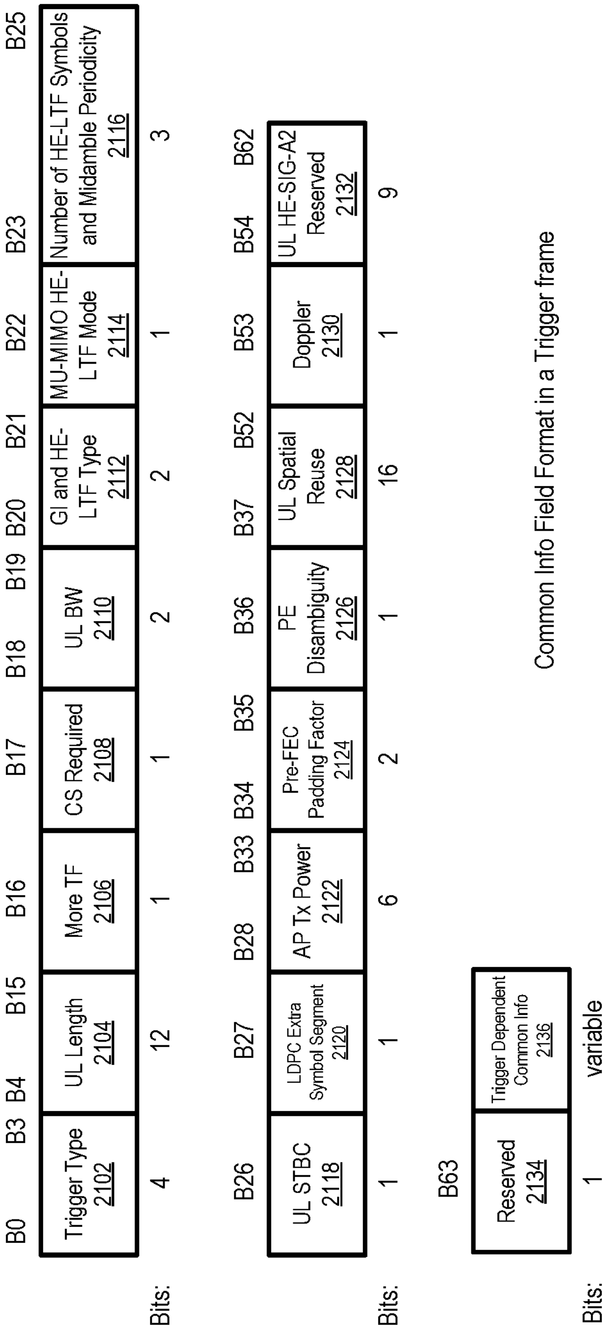
FIG. 21 is a diagram showing a common info field format in a trigger frame in IEEE 802.11ax.

FIG. 21 is a diagram showing a common info field format in a trigger frame in IEEE 802.11ax. As shown in the diagram, the common info field format includes a trigger type field 2102, a UL length field 2104, a more TF field 2106, a CS required field 2108, a UL BW field 2110, a GI and HE-LTF type field 2112, a MU-MIMO HE-LTF mode field 2114, a number of HE-LTF symbols and midamble periodicity field 2116, a UL STBC field 2118, a LDPC extra symbol segment field 2120, an AP Tx power field 2122, a pre-FEC padding factor field 2124, a PE disambiguity field 2126, a UL spatial reuse field 2128, a doppler field 2130, a UL HE-SIG-A2 reserved field 2132, a reserved field 2134, and a trigger dependent common info field 2136.

Figure 22:
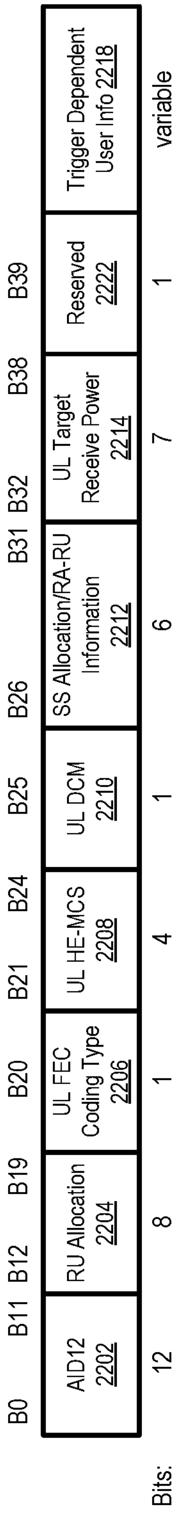
FIG. 22 is a diagram showing a user info list field format in a trigger frame in IEEE 802.11ax.

FIG. 22 is a diagram showing a user info list field format in a trigger frame in IEEE 802.11ax. As shown in the diagram, the user info list field format includes an AID12 field 2202, a RU allocation field 2204, a UL FEC coding type field 2206, a UL HE-MCS field 2208, a UL DCM field 2210, a SS allocation/RA-RU information field 2212, a UL target receive power field 2214, a reserved field 2216, and a trigger dependent user info field 2218.

FIG. 23 is a diagram showing a table of trigger type field encoding in a trigger frame in IEEE 802.11ax. As shown in the diagram, the table 2300 includes a trigger type field value column and a trigger frame variant column. A trigger type field value of "0" indicates a basic trigger frame, a trigger type field value of "1" indicates a beamforming report poll (BFRP) trigger frame, trigger type field value of "2" indicates a MU-BAR (multi-user block ACK request) trigger frame, a trigger type field value of "3" indicates a MU-RTS (multi-user request to send) trigger frame, a trigger type field value of "4" indicates a buffer status report poll (BSRP) trigger frame, a trigger type field value of "5" indicates a GCR (group cast retries) MU-BAR trigger frame, a trigger type field value of "6" indicates a bandwidth query report poll (BQRP) trigger frame, a trigger type field value of "7" indicates a NDP (null data packet) feedback report poll (NFRP) trigger frame, and trigger type field values "8" to "1S" are reserved.

FIG. 24 is a diagram showing a table of trigger type field encoding in a trigger frame, according to some embodiments. As mentioned above, a new type/variant of trigger frame (a LIFS trigger frame) may be defined to support low latency transmission during a LIFS interval. In an embodiment, the trigger type field of the trigger frame is used to indicate that low latency transmission is allowed during the LIFS interval. In an embodiment, the trigger type field of the trigger frame is also used to indicate the bandwidth to be used for low latency frame transmissions (e.g., for applying bandwidth extension). One or more of the reserved bits of the trigger type field can be used for this purpose. For example, as shown in table 2400, a trigger type field value of "8" may indicate that low latency transmission is allowed and trigger type field values "9" to "12" may be used to indicate the bandwidth for low latency transmission. The four values may indicate normal bandwidth, ×2 bandwidth (two times the bandwidth currently being used), ×4 bandwidth (four times the bandwidth currently being used), and ×8 bandwidth (eight times the bandwidth currently being used), respectively. The bandwidth can be extended into an adjacent channel of the current channel being used. Values "13" to "15" may be reserved. Although the example shown in the diagram uses a specific encoding, it will be appreciated that the other encodings can be used to achieve the same/similar result. In an embodiment, the length mode of the IFS or the LIFS-based transmission interval may be indexed. The length mode of the IFS may be information indicating whether the interframe space being used is LIFS or normal IFS and the LIFS-based transmission interval may indicate how long an interframe space interval is.

A technical advantage of embodiments described herein is that they allow low latency stations to transmit data during an interframe space even if another station occupies the channel/link for a long period of time (e.g., a long TXOP). This allows, for example, emergency data to be transmitted with negligible or guaranteed transmission delay in a WLAN.

Figure 25:
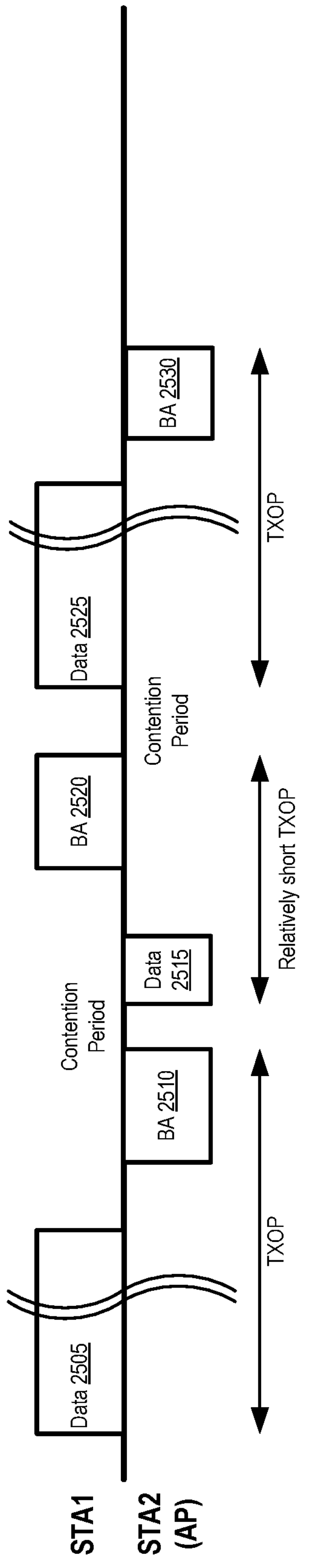
FIG. 25 is a diagram showing an asymmetric uplink/downlink traffic condition, according to some embodiments.

FIG. 25 is a diagram showing an asymmetric uplink/downlink traffic condition, according to some embodiments. As shown in the diagram, during a first TXOP, a first station (STA1) may transmit one or more data frames including data frame 2505 and a second station (STA2, which is an AP in this example) may transmit a block ACK frame 2510. After a contention period and during a second TXOP, STA2 may transmit a data frame 2515 and STA1 may transmit a block ACK frame 2520. The second TXOP is a relatively short TXOP. After a contention period and during a third TXOP, STA1 may transmit one or more data frames including data frame 2525 and STA2 may transmit a block ACK frame 2530.

When the amount of uplink and downlink traffic is asymmetric (e.g., the TXOP in one direction of uplink or downlink is long and the other direction is short), as in the example shown in the diagram, throughput and latency performance of the network can be degraded due to inefficient TXOP operation. For example, as shown in the diagram, the TXOP in the downlink direction (the second TXOP) is relatively short, and its performance is degraded due to overhead caused by backoff, interframe space, header, and/or control frames. In particular, this phenomenon leads to performance degradation of low latency applications.

Figure 26:
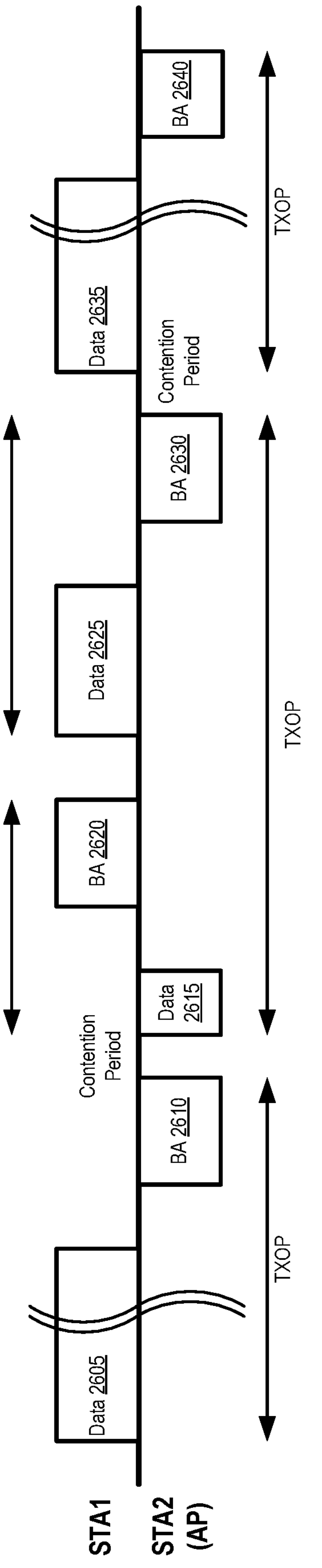
FIG. 26 is a diagram showing the use of a reverse direction protocol when there is an asymmetric uplink/downlink traffic condition, according to some embodiments.

A reverse direction protocol can be used to solve this problem, as shown in FIG. 26. In order to improve the inefficiency caused by low uplink traffic (low latency) from STA1 to STA2 (AP) (e.g., the TXOP sublease for uplink shown in the diagram), the TXOP may be subleased so that uplink transmission is possible after a short downlink transmission. In this way, throughput and latency can be improved by reducing content overhead, interframe space overhead, and/or frame header overhead.

FIG. 26 is a diagram showing the use of a reverse direction protocol when there is an asymmetric uplink/downlink traffic condition, according to some embodiments.

As shown in the diagram, during a first TXOP, STA1 may transmit one or more data frames including data frame 2605 and STA2 may transmit a block ACK frame 2610. After a contention period and during a second TXOP, STA2 may transmit a data frame 2615 and STA1 may transmit a block ACK frame 2620. Also, during the second TXOP, STA1 may transmit data frame 2625 and STA2 may transmit block ACK frame 2630. In this way, the second TXOP is subleased to perform uplink data transmission (e.g., from STA1 to STA2). After a contention period and during a third TXOP, STA1 transmits one or more data frames including data frame 2635 and STA2 transmits block ACK frame 2640.

The use of a reverse direction protocol can increase the efficiency of link usage (e.g., efficiency of channel utilization) by subleasing a TXOP to a peer when the amount of uplink/downlink traffic is asymmetric. However, conventional reverse direction protocols cannot efficiently support continuous transmission of low latency applications that have a short frame length and intermittent transmission characteristics. Also, it is difficult to secure a transmission opportunity for a low latency transmission STA when STAs other than the low latency transmission STA transmit using the TXOP technique and reverse direction protocol.

Figure 27:
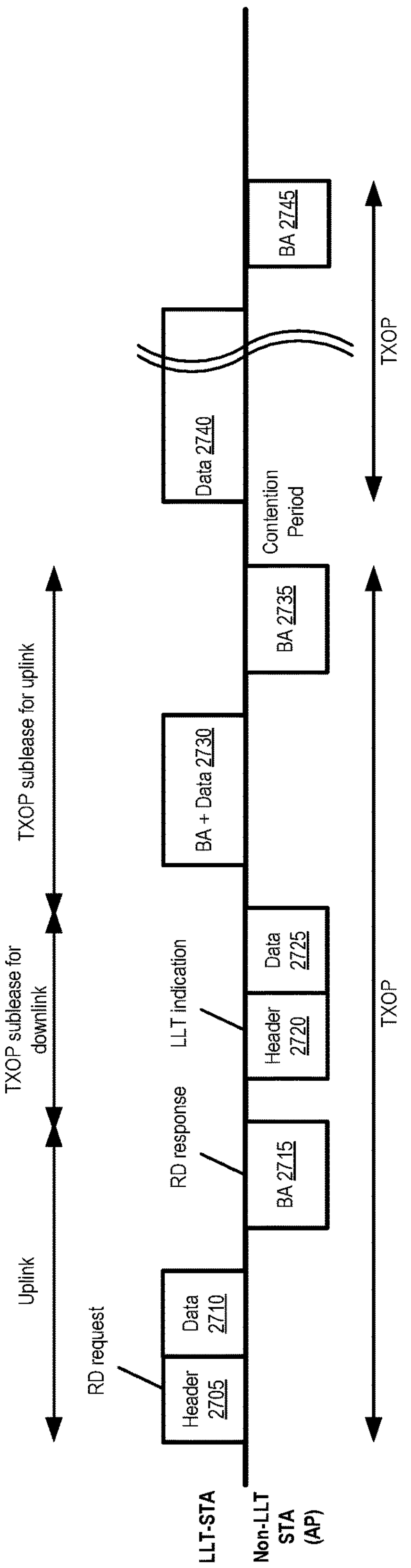
FIG. 27 is a diagram showing a combined block acknowledgement and data frame transmission by a low latency transmission STA in response to receiving a low latency transmission indication when using a reverse direction protocol, according to some embodiments.

FIG. 27 is a diagram showing a combined block acknowledgement and data frame transmission by a low latency transmission STA in response to receiving a low latency transmission indication when using a reverse direction protocol, according to some embodiments. As shown in the diagram, during a first TXOP, a low latency transmission STA (LL-STA) transmits a data frame 2710 with header 2705. Header 2705 includes a reverse direction (RD) request. A non-LLT station (non-LLT STA, which is an AP in this example) may transmit a block ACK frame 2715 that includes a RD response. The non-LLT STA may transmit a data frame 2725 with header 2720 during the first TXOP. In this way, the first TXOP is subleased for downlink transmission. Header 2720 may include a low latency transmission (LLT) indication. In response to determining that the frame header includes a low latency transmission indication, LLT-STA may transmit a combined block ACK and data frame 2730 ("BA+Data" frame) and non-LLT STA may transmit a block ACK frame 2735 during the first TXOP. In this way, the first TXOP is further subleased for uplink transmission. After a contention period and during a second TXOP, LLT-STA may transmit one or more data frames including data frame 2740 and non-LLT STA may transmit a block ACK frame 2745.

As illustrated in the example shown in the diagram, when the reverse direction protocol is started, a LLT indication can be included in the frame header of the reverse direction TXOP sublease, and the LLT-STA may transmit a combined block ACK and data frame. Thus, after the data frame that includes the LLT indication is transmitted, the LLT-STA may transmit a combined block ACK and data frame to reduce latency.

Figure 28:
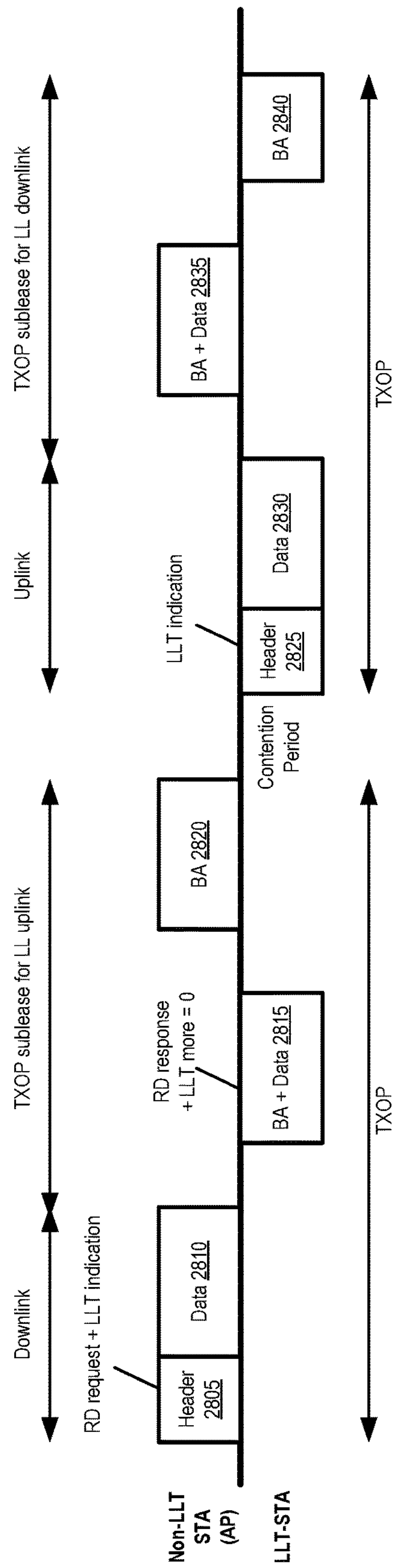
FIG. 28 is a diagram showing a continuous low latency transmission using a "LLT more" field when transmitting a combined block ACK and data frame, according to some embodiments.

FIG. 28 is a diagram showing a continuous low latency transmission using a "LLT more" field when transmitting a combined block ACK and data frame, according to some embodiments. As shown in the diagram, during a first TXOP, a non-LLT STA (which is an AP in this example) may transmit a data frame 2810 with header 2805. Header 2805 may include a RD request and a LLT indication. LLT-STA may transmits a combined block ACK and data frame 2815 that includes a RD response and with the "LL more" field set to "0". The "LLT more" field may be set to "0" to indicate that the TXOP cannot be further subleased. Non-LLT STA may then transmits a block ACK frame 2820. In this way, the first TXOP is subleased for low latency uplink transmission. After a contention period following the first TXOP and during a second TXOP, LLT-STA may transmit a data frame 2830 with a header 2825. Header 2825 may include a LLT indication. Non-LLT STA may transmit a combined block ACK and data frame 2835 and LLT-STA may transmit a block ACK frame 2840 during the second TXOP. In this way, the second TXOP is subleased for low latency downlink transmission.

As illustrated in the example shown in the diagram, when data frames including RD request and LLT indication are transmitted to the LLT-STA, LLT-STA may transmit a combined block ACK and data frame during the TXOP sublease interval. The latency of LLT-STA's transmission may be improved by transmitting a combined block ACK and data frame without having to transmit a block ACK frame and data frame separately.

Figure 29:
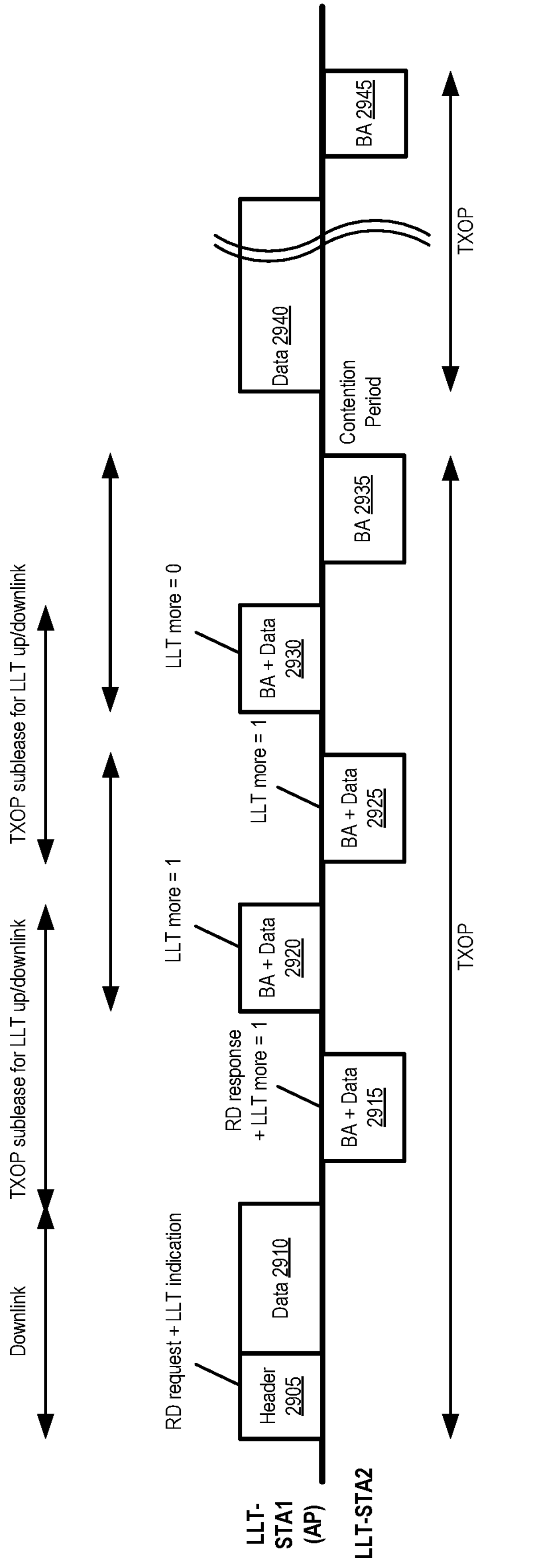
FIG. 29 is a diagram showing shows a continuous TXOP sublease for low latency uplink and downlink transmission, according to some embodiments.

FIG. 29 is a diagram showing shows a continuous TXOP sublease for low latency uplink and downlink transmission, according to some embodiments. As shown in the diagram, during a first TXOP interval, LLT-STA1 (which is an AP in this example) may transmit a data frame 2910 with a header 2905. Header 2905 may include a RD request and a LLT indication. LLT-STA2 may transmit a combined block ACK and data frame 2915 that includes a RD response and with the "LL more" field set to "1". The "LL more" field may be set to "1" to indicate that the TXOP can continue to be subleased for low latency transmission. LLT-STA1 may then transmit a combined block ACK and data frame 2920 with the "LLT more" field set to "1". LLT-STA2 may then transmit a combined block ACK and data frame 2925 with the "LLT more" field set to "1". LLT-STA1 may then transmit a combined block ACK and data frame 2930 with the "LLT more" field set to "0". The "LLT more" field may be set to "0" to indicate that the TXOP cannot be further subleased for low latency transmission. LLT-STA2 may then transmit a block ACK frame 2935. After a contention period and during a second TXOP, LLT-STA1 may transmit one or more data frames including data frame 2940 and LLT-STA2 may transmit a block ACK frame 2945.

As illustrated in the example shown in the diagram, LLT-STA1 and LLT-STA2 may continuously transmit combined block ACK and data frames by setting the "LLT more" field to "1" after the reverse direction protocol has started to allow continuous low latency uplink and downlink transmission. The TXOP is continuously subleased for low latency transmission while the "LLT more" field is set to "1", and the TXOP sublease ends when the "LLT more" field is set to "0".

Figure 30:
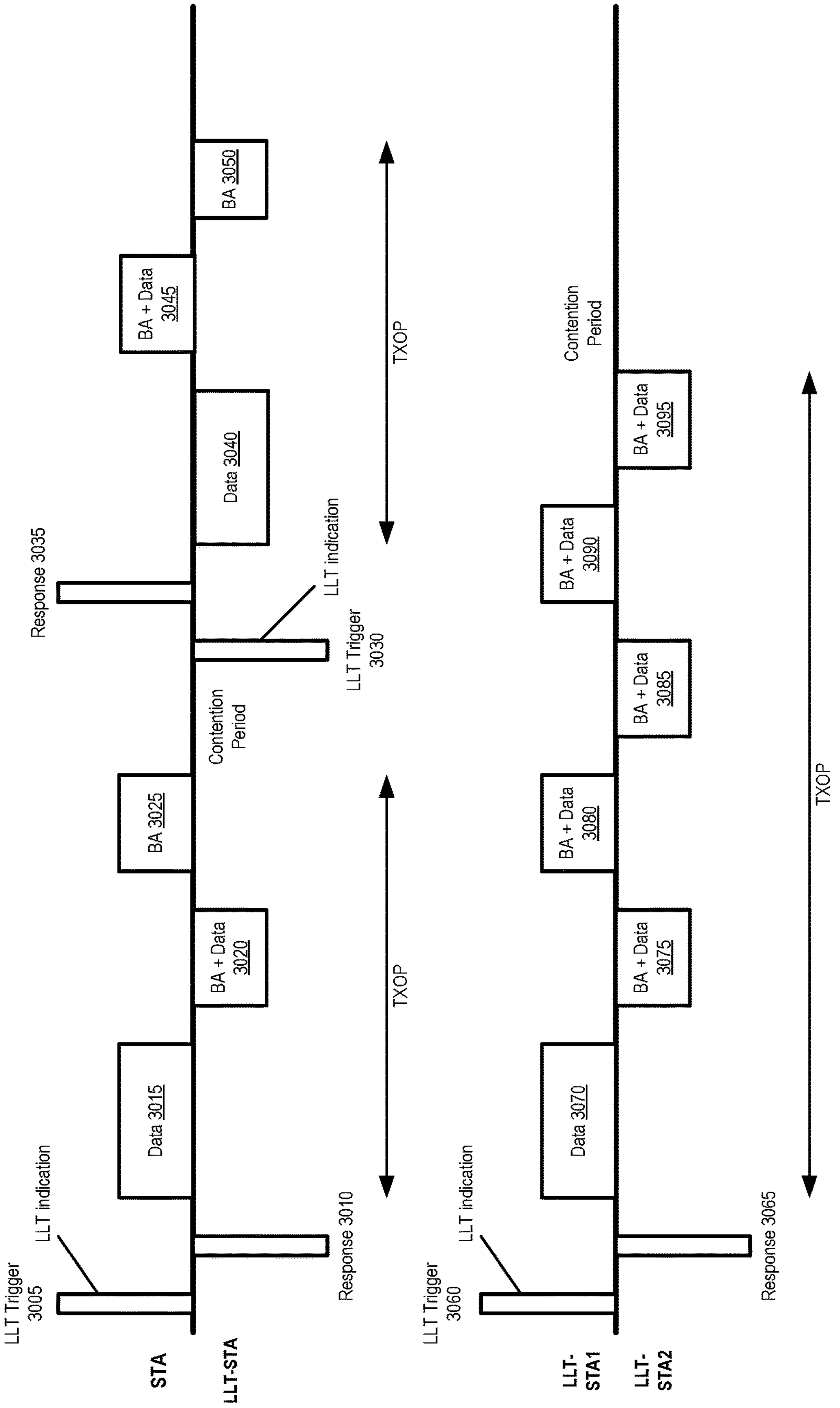
FIG. 30 is a diagram showing the use of a trigger frame to trigger an enhanced reverse direction protocol that allows low latency transmission, according to some embodiments.

In an embodiment, a trigger frame can be used to initiate an enhanced reverse direction protocol that allows low latency transmission during a transmission opportunity, as shown FIG. 30.

FIG. 30 is a diagram showing the use of a trigger frame to trigger an enhanced reverse direction protocol that allows low latency transmission, according to some embodiments. As shown in the diagram, a STA may transmit a trigger frame 3005 (a LLT trigger frame) that includes a low latency transmission indication. LLT-STA may transmit a response frame 3010 as a response to the LLT trigger frame 3005. During a first TXOP, STA may transmit a data frame 3015, LLT-STA may transmit a combined block ACK and data frame 3020, and STA may transmit a block ACK frame 3025. After a contention period, LLT-STA may transmit a LLT trigger frame 3030 that includes a low latency transmission indication. STA may transmit a response frame 3035 as a response to the LLT trigger frame 3030. During a second TXOP, LLT-STA may transmit a data frame 3040, STA may transmit a combined block ACK and data frame 3045, and then LL-STA may transmit a block ACK frame 3050.

The enhanced reverse direction protocol techniques described herein above improve latency when either the initiator or the responder using a reverse direction protocol or a TXOP is a low latency transmission STA or both are low latency transmission STAs. In some embodiments, as shown in FIG. 31, a low latency transmission STA can obtain a transmission opportunity when non-LLT STAs are transmitting using a reverse direction protocol.

Figure 31:
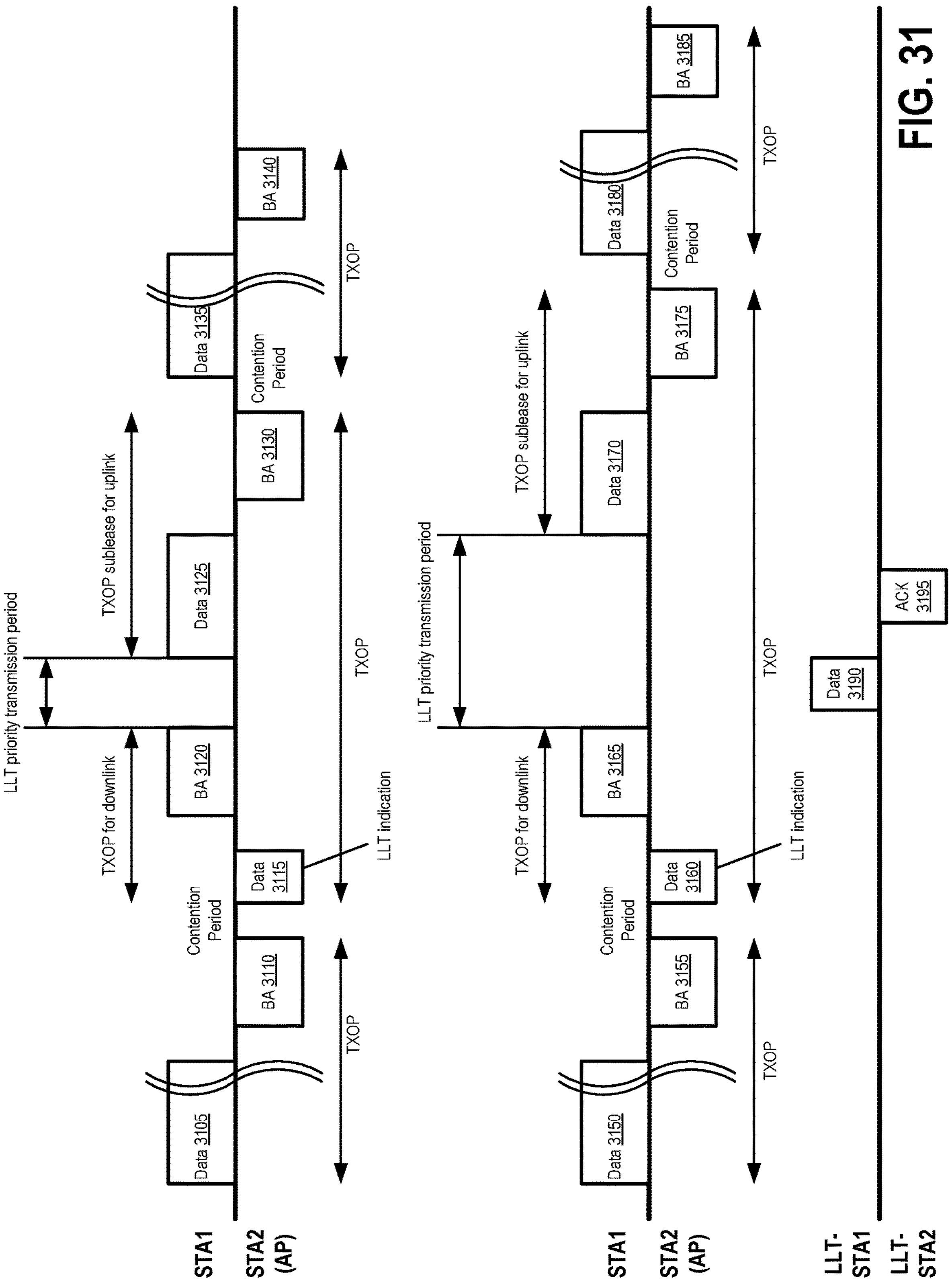
FIG. 31 is a diagram showing how a low latency transmission STA can obtain a transmission opportunity when non-LLT STAs transmit using a reverse direction protocol, according to some embodiments.

FIG. 31 is a diagram showing how a low latency transmission STA can obtain a transmission opportunity when non-LLT STAs transmit using a reverse direction protocol, according to some embodiments. As shown in the diagram, during a first TXOP, STA1 may transmit a data frame 3105 and STA2 may transmit a block ACK frame 3110. After a contention period and during a second TXOP, STA2 may transmit a data frame 3115 that includes a LLT indication and STA1 may transmit a block ACK frame 3120. Also, during the second TXOP, STA1 may transmit data frame 3125 and STA2 may transmit a block ACK frame 3130. It is noted here that there is a LLT priority transmission period between block ACK frame 3120 and data frame 3125. After a contention period following the end of the second TXOP and during a third TXOP, STA1 may transmit one or more data frames including data frame 3135 and STA2 may transmit a block ACK frame 3140.

In an embodiment, low latency transmission stations are allowed to transmit data during the LLT priority transmission period. For example, as shown in the diagram, during a first TXOP, STA1 may transmit data frame 3150 and STA2 may transmit block ACK frame 3155. After a contention period and during a second TXOP, STA2 may transmit data frame 3160 that includes a LLT indication and STA1 may transmit a block ACK frame 3165. Also, during the second TXOP, STA1 may transmit data frame 3170 and STA2 may transmit block ACK frame 3175. There is a LLT priority transmission period between block ACK frame 3165 and data frame 3170. During this LLT priority transmission period, LLT STAs (e.g., LLT-STA1 and/or LLT-STA2) may transmit a data frame 3190 and an ACK frame 3195. After a contention period following the transmission of block ACK frame 3175 and during a third TXOP, STA1 may transmit one or more data frames including data frame 3180 and STA2 may transmit a block ACK frame 3185.

As shown in the diagram, it can be indicated whether to allow priority transmission to a LLT-STA by including a LLT indication in the data frame. If LLT priority transmission is allowed, there is a LLT priority transmission period after the downlink TXOP, which then provides a TXOP release. This method can also allow a LLT priority transmission period among reverse direction protocols using the LL trigger frame.

FIG. 32 is a diagram showing a table of trigger type field encoding in a trigger frame, according to some embodiments. A new type/variant of trigger frame may be defined to support an enhanced reverse direction protocol that allows low latency transmission. In an embodiment, the structure of the new trigger frame is based on the existing trigger frame structure in IEEE 802.11ax, as shown in FIGS. 20-23. In an embodiment, when such a trigger frame format is used, it may operate without a response frame. In an embodiment, the trigger type field of the trigger frame is used to indicate that low latency transmission is allowed. In an embodiment, the trigger type field of the trigger frame indicates whether a TXOP can be further subleased for low latency transmission. One or more of the reserved bits of the trigger type field can be used for this purpose. For example, as shown in table 3200, trigger type field values of "8" and "9" can be used to indicate whether low latency transmission is allowed ("LLT indication"—one of the values can indicate "no grant" and the other value can indicate "grant") and trigger type field values "10" and "11" are used to indicate whether a TXOP can be further subleased for low latency transmission ("LLT more"—one of the values can indicate "no more" and the other value can indicate "more"). Values "12" to "15" are reserved. Although the example shown in the diagram uses a specific encoding, it will be appreciated that the other encodings can be used to achieve the same/similar result. For example, there can be a bit/flag for indicating whether low latency transmission is allowed (e.g., bit value "1" indicates "grant" and bit value of "0" indicates "no grant") and/or a bit/flat for indicating whether a TXOP can be further subleased for low latency transmission (e.g., bit value "1" indicates "more" and bit value of "0" indicates "no more").

FIG. 33 is a combined block ACK and data frame format, according to some embodiments. As shown in the diagram, the combined block ACK and data frame format includes a frame control field 3302 (2 octets), a duration field 3304 (2 octets), a RA field 3306 (6 octets), a TA field 3308 (6 octets), a BA control field 3310 (2 octets), a starting sequence control field 3312 (2 octets), a block ACK bitmap field 3314 (8 or 128 octets), a payload field 3316 (variable length), and a FCS field 3318 (4 octets).

In an embodiment, the value of the RA field 3306 is set to the address of the transmitter taken from the TA field of the BAR or data frame that solicited the block ACK and the value of the TA field 3308 is set to the address of the receiver taken from the RA field of the BAR or data frame that solicited the block ACK.

FIG. 34 is a diagram showing a BA control field format and interpretation of the reserved field, according to some embodiments.

As shown in the diagram, the BA control field format includes a BA ACK policy field 3402 (B0), a multi-TID field (B1), a compressed bitmap field 3406 (B2), a reserved field 3408 (B3-B11), and a TID/num TIDs field 3410 (B12-B15). In an embodiment, when using the combined block ACK and data frame format such as the format shown in FIG. 33, the reserved field 3408 of the BA control field 3310 can be used to indicate whether low latency transmission is allowed and/or to indicate whether a TXOP can be further subleased for low latency transmission. For example, as shown in the table shown in FIG. 34, bit B3 can be used to indicate whether low latency transmission is allowed (e.g., bit B3 being set to binary "0" indicates "no grant" and bit B3 being set to binary "1" indicates "grant"). Also, bit B4 can be used to indicate whether a TXOP can be further subleased for low latency transmission (e.g., bit B4 being set to binary "0" indicates "no more" and bit B4 being set to binary "1" indicates "more"). Bits B5-B11 may be reserved.

Figure 35:
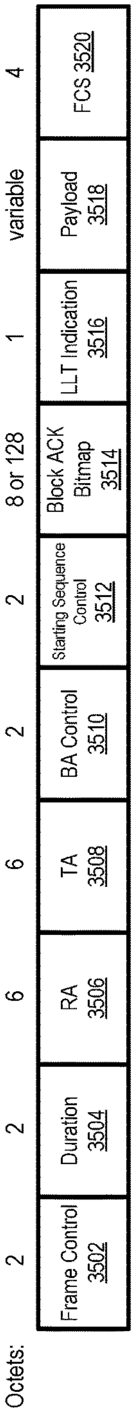
FIG. 35 is a diagram showing a combined block ACK and data frame format with low latency transmission indication, according to some embodiments.

FIG. 35 is a diagram showing a combined block ACK and data frame format with low latency transmission indication, according to some embodiments.

As shown in the diagram, the combined block ACK and data frame format includes a frame control field 3502 (2 octets), a duration field 3504 (2 octets), a RA field 3506 (6 octets), a TA field 3508 (6 octets), a BA control field 3510 (2 octets), a starting sequence control field 3512 (2 octets), a block ACK bitmap field 3514 (8 or 128 octets), a LLT indication field 3516 (1 octet), a payload field 3518 (variable length), and a FCS field 3520 (4 octets).

In an embodiment, if LLT indication is not included in the BA control field, low latency transmission may be allowed using the LLT indication field 3516 of the combined block ACK and data frame.

Figure 36:
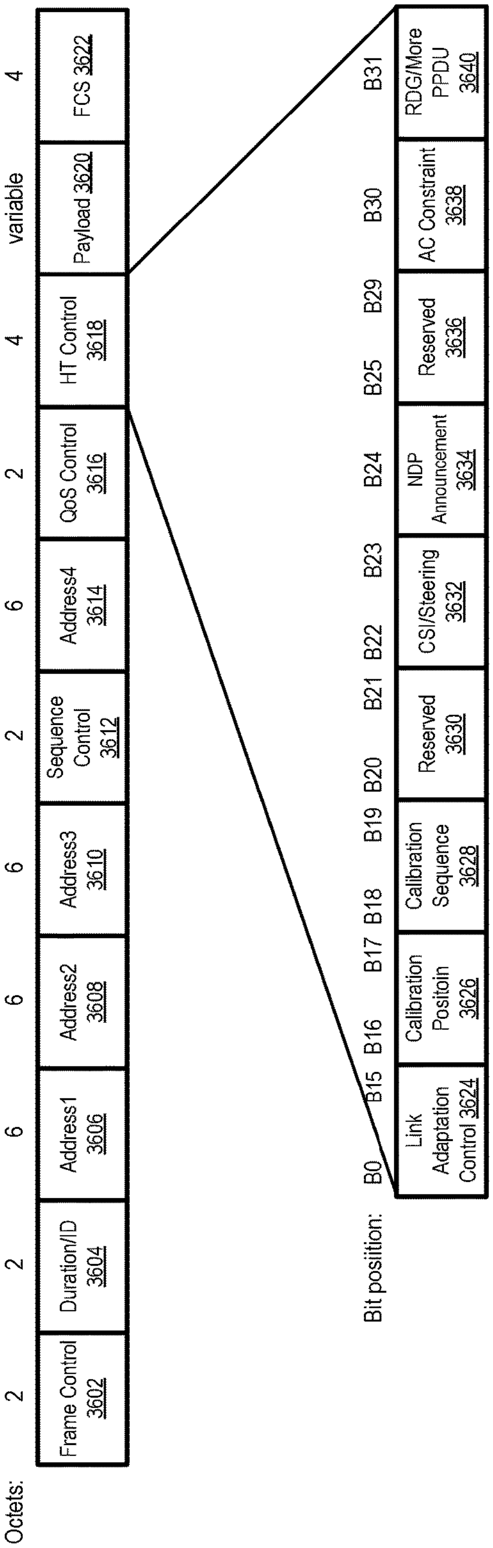
FIG. 36 is a diagram showing a data frame format, according to some embodiments.

FIG. 36 is a diagram showing a data frame format, according to some embodiments.

As shown in the diagram, the data frame format includes a frame control field 3602 (2 octets), a duration/ID field 3604 (2 octets), an address1 field 3606 (6 octets), an address2 field 3608 (6 octets), an address1 field 3610 (6 octets), a sequence control field 3612 (2 octets), an address4 field 3614 (6 octets), a QoS control field 3616 (2 octets), a HT control field 3618 (4 octets), a payload field 3620 (variable length), and a FCS field 3622 (4 octets).

Also, as shown in the diagram, the HT control field 3618 includes a link adaptation control field 3624 (B0-B15), a calibration position field 3626 (B16-B17), a calibration sequence field 3628 (B18-B19), a reserved field 3630 (B20-B21), a CSI/steering field 3632 (B22-B23), a NDP announcement field 3634 (B24), a reserved field 3636 (B25-B29), an AC constraint field 3638 (B30), and a RDG/more PPDU field 3640 (B31).

FIG. 37 is a diagram showing a table of an interpretation of reserved bits of a HT control field, according to some embodiments. In an embodiment, the HT control field is used to indicate whether low latency transmission is allowed and/or to indicate whether a TXOP can be further subleased for low latency transmission when transmitting reverse direction protocol mode information using the RDG/more PPDU field 3640.

For example, as shown in the table 3700, bit B20 may be used to indicate whether low latency transmission is allowed (e.g., bit B20 being set to binary "0" indicates "no grant" and bit B20 being set to binary "1" indicates "grant") and bit B21 may be used to indicate whether a TXOP can be further subleased for low latency transmission (e.g., bit B21 being set to binary "0" indicates "no more" and bit B21 being set to binary "1" indicates "more"). Bits B25-B29 may be reserved.

FIG. 38 is a diagram showing a table of an interpretation of a RDG/more PPDU field, according to some embodiments. As shown in the table 3800, a value of "0" indicates reverse direction is not being granted when the role of the transmitting STA is RD initiator and indicates that the PPDU carrying the frame is the last PPDU from the RD responder when the role of the transmitting STA is RD responder. Also, a value of "1" indicates that reverse direction grant is present for the duration given in the duration/ID field when the role of the transmitting STA is RD initiator and indicates that the PPDU carrying the frame is followed by another PPDU when the role of the transmitting STA is RD responder.

A technical advantage of embodiments described herein is that they enhance the reverse direction protocol to allow low latency transmission (e.g., for emergency data) without channel sensing. Embodiments provide low latency devices the opportunity to transmit without competition and/or allow continuous data transmission when using the reverse direction protocol. Embodiments can be used to transmit emergency data with negligible or guaranteed transmission delay in a WLAN.

Figure 39:
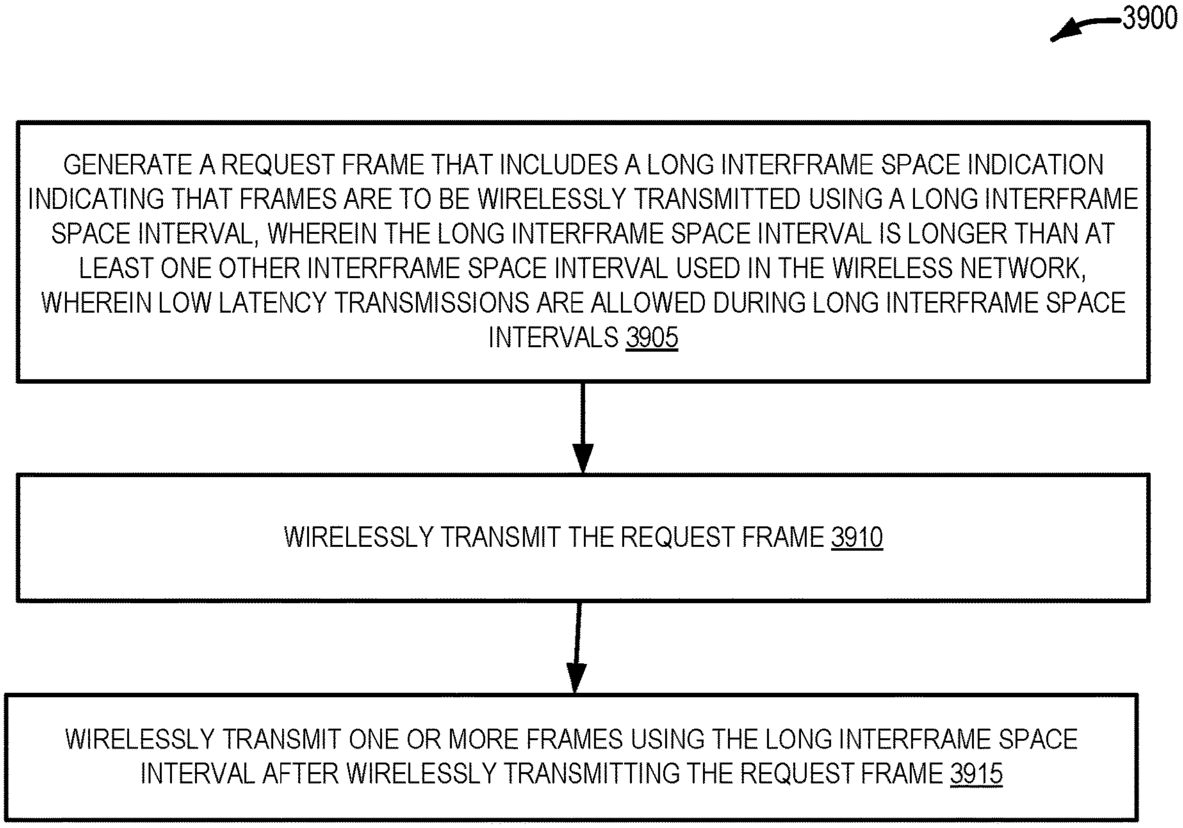
FIG. 39 is a flow diagram showing a method for allowing low latency transmission between frames, according to some embodiments.

Turning now to FIG. 39, a method 3900 will be described for allowing low latency transmission between frames, in accordance with an example embodiment. The method 3900 may be performed by one or more devices described herein. For example, the method 3900 may be performed by a wireless device 104 in a wireless network.

Additionally, although shown in a particular order, in some embodiments the operations of the method 3900 (and the other methods shown in the other figures) may be performed in a different order. For example, although the operations of the method 3900 are shown in a sequential order, some of the operations may be performed in partially or entirely overlapping time periods.

As shown in FIG. 39, the method 3900 may commence at operation 3905 with a wireless device generating a request frame that includes a long interframe space indication indicating that frames are to be wirelessly transmitted using a long interframe space interval, wherein the long interframe space interval is longer than at least one other interframe space interval used in the wireless network, wherein low latency transmissions are allowed during long interframe space intervals.

In an embodiment, the long interframe space indication includes information regarding a long interframe space period during which the long interframe space interval is to be used and a short interframe space period during which a interframe space interval that is shorter than the long interframe space interval is to be used.

At operation 3910, the wireless device wirelessly transmits the request frame.

In an embodiment, the request frame is a trigger frame that includes a common information field, wherein the common information field includes a trigger type field, wherein the trigger type field indicates that low latency transmissions are allowed during long interframe space intervals. In an embodiment, the trigger type field further indicates a bandwidth to use when wirelessly transmitting low latency frames during long interframe space intervals.

At operation 3915, the wireless device wirelessly transmits one or more frames using the long interframe space interval after wirelessly transmitting the request frame.

In an embodiment, a low latency data frame is wirelessly transmitted during a first long interframe space interval, and wherein a low latency acknowledgement frame for the low latency data frame is wirelessly transmitted during a second long interframe space interval that occurs after the first long interframe space interval.

In an embodiment, a low latency data frame is wirelessly transmitting during each of a plurality of long interframe space intervals, and wherein a low latency block acknowledgement frame is wirelessly transmitting during a long interframe space interval that occurs after the plurality of long interframe space intervals.

In an embodiment, a low latency data frame and a low latency acknowledgement frame are wirelessly transmitted during the same long interframe space interval. In an embodiment, bandwidth extension is applied to the low latency data frame and the low latency acknowledgement frame.

In an embodiment, the wireless device wirelessly transmits, during an interframe space interval that is shorter than the long interframe space interval, a second request frame that includes a second long interframe space indication indicating that frames are to be wirelessly transmitted using the long interframe space interval instead of the interframe space interval that is shorter than the long interframe space interval.

Figure 40:
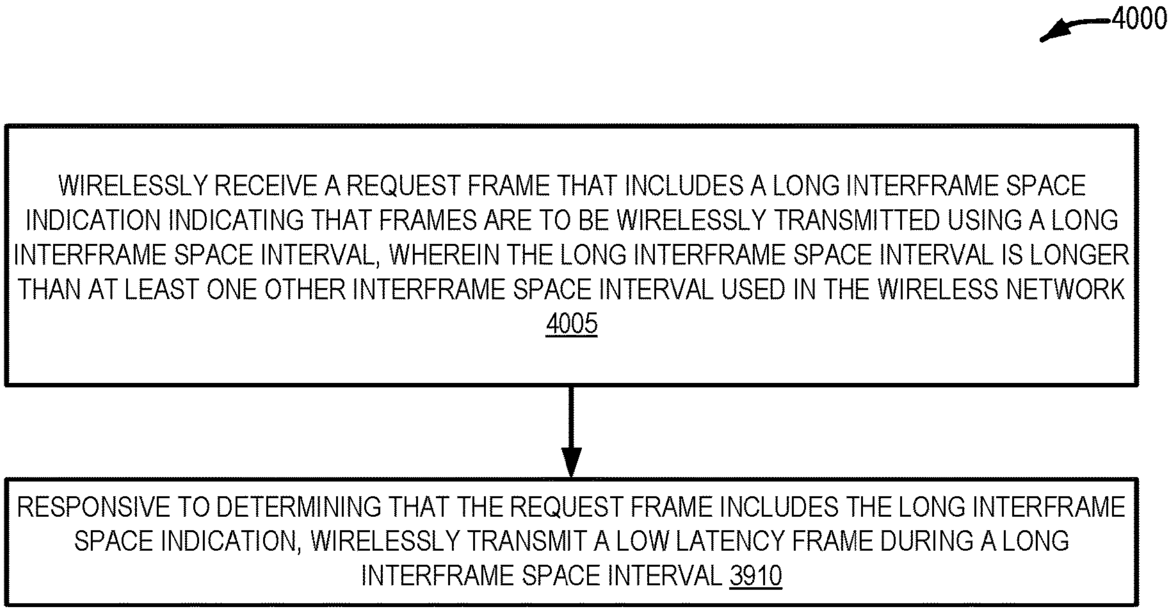
FIG. 40 is a flow diagram showing a method for transmitting low latency frames between normal frames, according to some embodiments.

Turning now to FIG. 40, a method 4000 will be described for transmitting low latency frames between normal frames, in accordance with an example embodiment. The method 4000 may be performed by one or more devices described herein. For example, the method 4000 may be performed by a wireless device 104 in a wireless network.

As shown in FIG. 40, the method 4000 may commence at operation 4005 with a wireless device wirelessly receiving a request frame that includes a long interframe space indication indicating that frames are to be wirelessly transmitted using a long interframe space interval, wherein the long interframe space interval is longer than at least one other interframe space interval used in the wireless network.

At operation 4010, responsive to determining that the request frame includes the long interframe space indication, the wireless device wirelessly transmits a low latency frame during a long interframe space interval.

Figure 41:
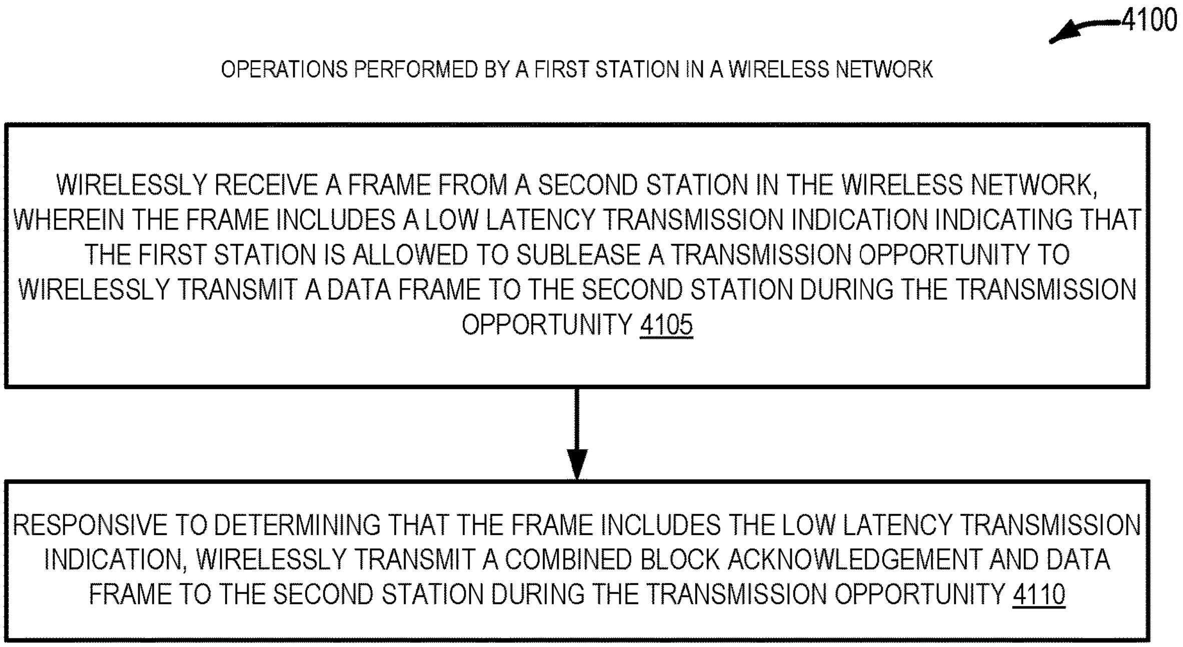
FIG. 41 is a flow diagram showing a method for implementing an enhanced reverse direction protocol that allows for low latency transmission, according to some embodiments.

Turning now to FIG. 41, a method 4100 will be described for implementing an enhanced reverse direction protocol that allows for low latency transmission, in accordance with an example embodiment. The method 4100 may be performed by one or more devices described herein. For example, the method 4100 may be performed by a wireless device 104 functioning as a first station in a wireless network.

As shown in FIG. 41, the method 4100 may commence at operation 4105 with the first station wirelessly receiving a frame from a second station in the wireless network, wherein the frame includes a low latency transmission indication indicating that the first station is allowed to sublease a transmission opportunity to wirelessly transmit a data frame to the second station during the transmission opportunity.

In an embodiment, the frame is wirelessly transmitted by the second station to the first station as a reverse direction transmission during the transmission opportunity.

In an embodiment, the frame further includes a reverse direction request indication indicating that a reverse direction transmission is being granted to the first station.

In an embodiment, the frame is a trigger frame. In an embodiment, the frame includes a common information field, wherein the common information field includes a trigger type field, wherein the trigger type field includes the low latency transmission indication.

In an embodiment, the frame is a data frame. In an embodiment, the data frame includes a HT control field, wherein the HT control field includes the low latency transmission indication.

At operation 4110, responsive to determining that the frame includes the low latency transmission indication, the first station wirelessly transmits a combined block acknowledgement and data frame to the second station during the transmission opportunity.

In an embodiment, the combined block acknowledgement and data frame includes a more low latency transmission indication indicating that the second station is allowed to further sublease the transmission opportunity to wirelessly transmit a data frame to the first station. In an embodiment, the first station wirelessly receives a second combined block acknowledgement and data frame from the second station after wirelessly transmitting the combined block acknowledgement and data frame to the second station. In an embodiment, the combined block acknowledgement and data frame includes a block acknowledgement control field, wherein the block acknowledgement control field includes the more low latency transmission indication.

Figure 42:
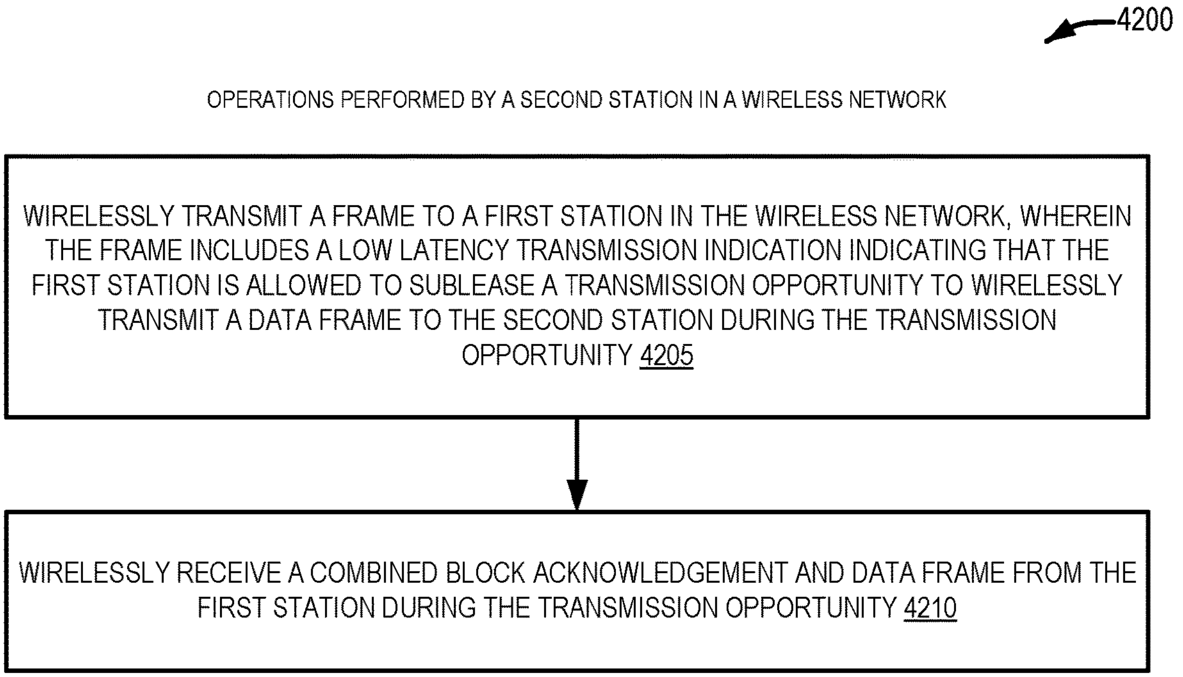
FIG. 42 is a flow diagram showing a method for implementing an enhanced reverse direction protocol that allows for low latency transmission, according to some embodiments.

Turning now to FIG. 42, a method 4200 will be described for implementing an enhanced reverse direction protocol that allows for low latency transmission, in accordance with an example embodiment. The method 4200 may be performed by one or more devices described herein. For example, the method 4200 may be performed by a wireless device 104 functioning as a second station in a wireless network.

As shown in FIG. 42, the method 4200 may commence at operation 4205 with the second station wirelessly transmitting a frame to a first station in the wireless network, wherein the frame includes a low latency transmission indication indicating that the first station is allowed to sublease a transmission opportunity to wirelessly transmit a data frame to the second station during the transmission opportunity.

At operation 4210, the second station wirelessly receives a combined block acknowledgement and data frame from the first station during the transmission opportunity.

Although many of the solutions and techniques provided herein have been described with reference to a WLAN system, it should be understood that these solutions and techniques are also applicable to other network environments, such as cellular telecommunication networks, wired networks, etc. In some embodiments, the solutions and techniques provided herein may be or may be embodied in an article of manufacture in which a non-transitory machine-readable medium (such as microelectronic memory) has stored thereon instructions which program one or more data processing components (generically referred to here as a "processor" or "processing unit") to perform the operations described herein. In other embodiments, some of these operations might be performed by specific hardware components that contain hardwired logic (e.g., dedicated digital filter blocks and state machines). Those operations might alternatively be performed by any combination of programmed data processing components and fixed hardwired circuit components.

In some cases, an embodiment may be an apparatus (e.g., an AP STA, a non-AP STA, or another network or computing device) that includes one or more hardware and software logic structures for performing one or more of the operations described herein. For example, as described herein, an apparatus may include a memory unit, which stores instructions that may be executed by a hardware processor installed in the apparatus. The apparatus may also include one or more other hardware or software elements, including a network interface, a display device, etc.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. For example, a computer system or other data processing system may carry out the computer-implemented methods described herein in response to its processor executing a computer program (e.g., a sequence of instructions) contained in a memory or other non-transitory machine-readable storage medium. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method performed by a wireless device in a wireless network to allow low latency transmissions between frames, the method comprising:

generating a request frame that includes a long interframe space indication indicating that frames are to be wirelessly transmitted using a long interframe space interval, wherein the long interframe space interval is longer than at least one other interframe space interval used in the wireless network, wherein low latency transmissions are allowed during long interframe space intervals;

wirelessly transmitting the request frame; and wirelessly transmitting one or more frames using the long interframe space interval after wirelessly transmitting the request frame.

2. The method of claim 1, wherein the long interframe space indication includes information regarding a long interframe space period during which the long interframe space interval is to be used and a short interframe space period during which a interframe space interval that is shorter than the long interframe space interval is to be used.

3. The method of claim 1, wherein a low latency data frame is wirelessly transmitted during a first long interframe space interval, and wherein a low latency acknowledgement frame for the low latency data frame is wirelessly transmitted during a second long interframe space interval that occurs after the first long interframe space interval.

4. The method of claim 1, wherein a low latency data frame is wirelessly transmitting during each of a plurality of long interframe space intervals, and wherein a low latency block acknowledgement frame is wirelessly transmitting during a long interframe space interval that occurs after the plurality of long interframe space intervals.

5. The method of claim 1, wherein a low latency data frame and a low latency acknowledgement frame are wirelessly transmitted during the same long interframe space interval.

6. The method of claim 5, wherein bandwidth extension is applied to the low latency data frame and the low latency acknowledgement frame.

7. The method of claim 1, further comprising:

wirelessly transmitting, during an interframe space interval that is shorter than the long interframe space interval, a second request frame that includes a second long interframe space indication indicating that frames are to be wirelessly transmitted using the long interframe space interval instead of the interframe space interval that is shorter than the long interframe space interval.

8. The method of claim 1, wherein the request frame is a trigger frame that includes a common information field, wherein the common information field includes a trigger type field, wherein the trigger type field indicates that low latency transmissions are allowed during long interframe space intervals.

9. The method of claim 8, wherein the trigger type field further indicates a bandwidth to use when wirelessly transmitting low latency frames during long interframe space intervals.

10. A wireless device comprising:

a radio frequency transceiver;

a memory device storing a set of instructions; and a processor coupled to the memory device, wherein the set of instructions when executed by the processor causes the wireless device to:

generate a request frame that includes a long interframe space indication indicating that frames are to be wirelessly transmitted using a long interframe space interval, wherein the long interframe space interval is longer than at least one other interframe space interval used in the wireless network, wherein low latency transmissions are allowed during long interframe space intervals, wirelessly transmit the request frame, and wirelessly transmit one or more frames using the long interframe space interval after wirelessly transmitting the request frame.

* * * * *